US008827256B2

(12) United States Patent
Marcos et al.

(10) Patent No.: US 8,827,256 B2

(45) Date of Patent: Sep. 9, 2014

(54) ALIGNMENT METHOD USING PALLET PRONGS AND PACKAGE CUTOUTS

(75) Inventors: John C. Marcos, Belmont, MA (US); Marcel Gerber, Zurich (CH); Edwin Sanders, Eindhoven (NL); Mark Hodak, Windsor (CA)

(73) Assignee: Vistaprint Schweiz GmbH, Winterthur (CH)

( * ) Notice: Subject to any disclaimer, the term of this patent is extended or adjusted under 35 U.S.C. 154(b) by 442 days.

(21) Appl. No.: 12/834,877

(22) Filed: Jul. 12, 2010

(65) Prior Publication Data

US 2012/0007300 A1 Jan. 12, 2012

(51) Int. Cl.

| | |
|---|---|
| ***B23Q 3/00*** | (2006.01) |
| ***B44B 3/00*** | (2006.01) |
| ***B44B 3/06*** | (2006.01) |
| *B41C 1/02* | (2006.01) |
| *A45C 11/18* | (2006.01) |

(52) U.S. Cl.

CPC ................. *B44B 3/065* (2013.01); *B44B 3/009* (2013.01); *B41C 1/02* (2013.01); *A45C 11/182* (2013.01)

USPC ....................................... 269/289 R; 269/291

(58) Field of Classification Search

USPC .................................. 269/289 R, 302.1, 291

See application file for complete search history.

(56) References Cited

U.S. PATENT DOCUMENTS

| | | | | |
|---|---|---|---|---|
| 2,855,677 | A * | 10/1958 | Scruggs | 33/23.01 |
| 3,570,129 | A * | 3/1971 | Vecchio | 33/25.2 |
| 4,327,786 | A * | 5/1982 | Markkula | 144/154 |
| 5,131,535 | A * | 7/1992 | O'Connor et al. | 206/722 |
| 5,927,503 | A * | 7/1999 | Nevill et al. | 206/701 |
| 6,478,515 | B1 * | 11/2002 | Mueller | 409/132 |
| 6,817,814 | B2 * | 11/2004 | Mueller | 409/132 |
| 6,822,192 | B1 * | 11/2004 | Young | 219/121.69 |
| 7,435,099 | B2 * | 10/2008 | Kirkus | 439/66 |

FOREIGN PATENT DOCUMENTS

| | | | |
|---|---|---|---|
| EP | 1652784 | A1 * | 5/2006 |
| JP | 2006027706 | A * | 2/2006 |
| WO | 2006/008928 | | 1/2006 |

OTHER PUBLICATIONS

Machine translation of JP2006-22706A, date pulled May 15, 2013, p. 1-11.*

International Search Report dated Jan. 16, 2012 for International Application No. PCT/US2011/043657.

Written Opinion of the International Searching Authority dated Jan. 12, 2013 for International Application No. PCT/US2011/043657.

* cited by examiner

*Primary Examiner* — Elizabeth A Plummer

(74) *Attorney, Agent, or Firm* — Jessica Costa

(57) ABSTRACT

Systems, methods and packaging for aligning packaged articles of manufacture in pallet.

5 Claims, 23 Drawing Sheets

ALIGNMENT METHOD USING PALLET PRONGS AND PACKAGE CUTOUTS

BACKGROUND OF THE INVENTION

The present invention relates generally to engraving articles of manufacture, and more particularly to techniques for simultaneously mass producing engraved articles of manufacture with potentially different customized engraved patterns.

Mechanical engraving is the traditional way to produce engraved articles, and involves the removal of material from the substrate through mechanical means such as precision drilling and grinding. With mechanical engraving machines, it is possible to achieve very precise high-resolution engravings with a substantial range of depth to result in an engraving having an ascetically-pleasing appearance.

Use of a laser is another technique for engraving articles. Laser engraving involves modification of the optical appearance of the surface of the article by a laser beam, for example through ablation of material and/or removal of some of a surface layer. Other types of laser marking include carbonization (slight burning) for substrates such as paper, cardboard, wood, or polymers, transformation (e.g. bleaching) of pigments (industrial laser additives) in a plastic material substrate, expansion of a polymer, if e.g. some additive is evaporated, and generation in the substrate of surface structures such as small bubbles. The ability of a laser to mark a surface and the quality of the marking depends on multiple factors, including the wavelength of the laser, the power of the laser, and the material being marked.

Many types of articles are engraved. For example, businesses will often engrave pens, plaques, business card holders, and other promotional items with information such as the name of a business or a marketing or other type message. The types of articles and reasons for engraving such articles are numerous. However, one common factor in the engraving industry is that the article being engraved is not typically manufactured by the entity doing the engraving. More typically, articles are manufactured by a first entity (e.g., a first company or business), ordered by a second entity (e.g., a second company or business), and engraved by either the second entity or yet a third entity (e.g., a third company or business).

For the general consuming public, engraving a product is often considered a luxury due to the extra care, time and expense involved and the added manufacturing step of performing the engraving. Accordingly, engraving an item may be reserved for special occasions or important events or distinctions. Furthermore, engraving machines have heretofore been directed at engraving a single article of manufacture at a time. For this reason, orders for customized engraved articles of manufacture are typically short-run (for example, 1 to less than 5000) manufacturing jobs and don't lend themselves to mass-production of multiple different engraving jobs.

It would be desirable to have systems and methods that enable mass production of customized engraved articles of manufacture.

SUMMARY

The present invention is directed at alignment techniques using pallet prongs and package cutouts.

In an embodiment, a manufacturing carrier comprises a plurality of seats comprising at least one alignment prong, the plurality of seats configured to receive packaged articles of manufacture, the articles of manufacture packaged in packaging that includes one or more alignment cutouts corresponding to positions of the alignment prongs when the articles of manufacture are properly seated in the carrier, the alignment prongs engaging the article of manufactures inside the packaging through the corresponding packaging cutouts when the articles of manufacture are properly seated in the carrier.

In another embodiment, packaging designed to operate in conjunction with a manufacturing carrier comprises a body packaging an article of manufacture, the body comprising at least one cutout to expose the article of manufacture such that an alignment prongs engages the article of manufacture inside the packaging through the corresponding packaging cutout when the article of manufacture is properly seated in the carrier.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION

Aspects of the invention include machines and methodologies for mass production of engraved articles of manufacture.

It will be understood that, while the discussion herein describes an embodiment of the invention in the field of engraving or marking of customized pens and business card holders, it will be understood that the invention is not so limited and is relevant to any application for engraving or otherwise marking multiple products in a single job.

Hereinafter, the terms "engrave", "engraved", or "engraving" shall include mechanical engraving, laser engraving, and other forms of laser marking such as carbonization, pigment transformation, polymer expansion, and other structural or optical modification of the material being marked. Furthermore, while the embodiment(s) described herein will be described in the context of laser engraving, the principles of mass marking of multiple customized articles of manufacture shall not be limited thereto.

Figure 1:
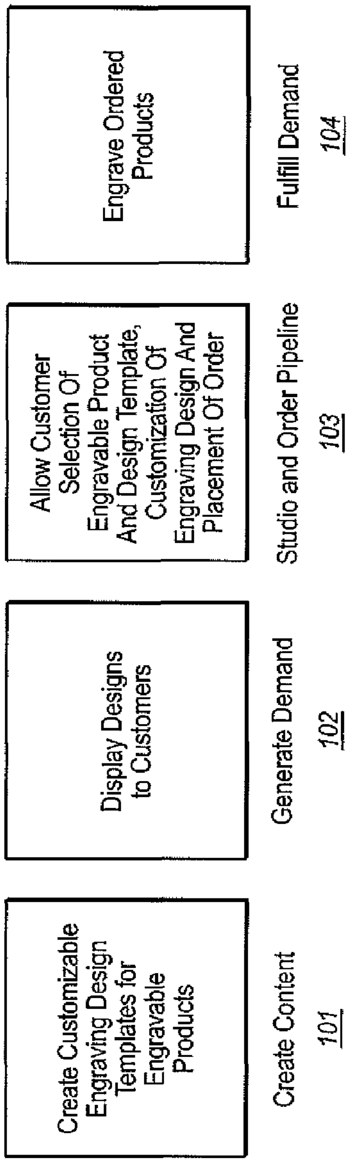
FIG. 1 is a high-level flow diagram illustrating an online retail model.

FIG. 1 shows a high-level flow diagram illustrating a model for offering, selling and producing engraved products containing various customized engraved designs/patterns through a computerized environment. The model includes a Create Content component 101 whereby content such as engraving designs, graphics, templates, etc. which may later be offered as, or incorporated into other, engraving designs to be engraved on articles of manufacture are created or otherwise obtained. The model further includes a Generate Demand component 102 through which customer interest in engraved products incorporating the content is generated. The Generate Demand component 102 may comprise, for example, web pages of an online retailer's website that display one or more products that can be engraved and various designs that may be engraved on the products that are available for ordering by a customer. The model further includes an Order Pipeline component 103 through which a product to be engraved is selected and customized by a customer and an order for the engraved product is placed. In an online retailer's website, the Order Pipeline component 103 may comprise design tools, discussed hereinafter, that allow the customer to select a product engraving design template and to customize text and/or graphical components of the engraving design prior to ordering one or more engraved products engraved with the design.

The model further includes an Order Fulfillment component 104 which accepts orders from the Order Pipeline component 103 and manufactures or otherwise fills, engraves, and ships the orders to the customers. In some instances, the Order Fulfillment component 104 includes a warehouse or other storage facility which stores stock products available and ready for engraving and shipment. In other instances, the Order Fulfillment component 104 is a manufacturing facility which manufactures the ordered items and then engraves them according to the engraving design specified in the order. In other embodiments, the Order Fulfillment component 104 embodies manufacturing, warehousing, and shipping, and each component may be performed by different business entities owned by the same or different parties. In an embodiment, each of the Create Content component 101, the Generate Demand component 102, the Order Pipeline component 103, and Order Fulfillment component 104 is implemented at least in part using one or more computer systems, for example as illustrated and discussed in connection with FIG. 12.

Figure 2:
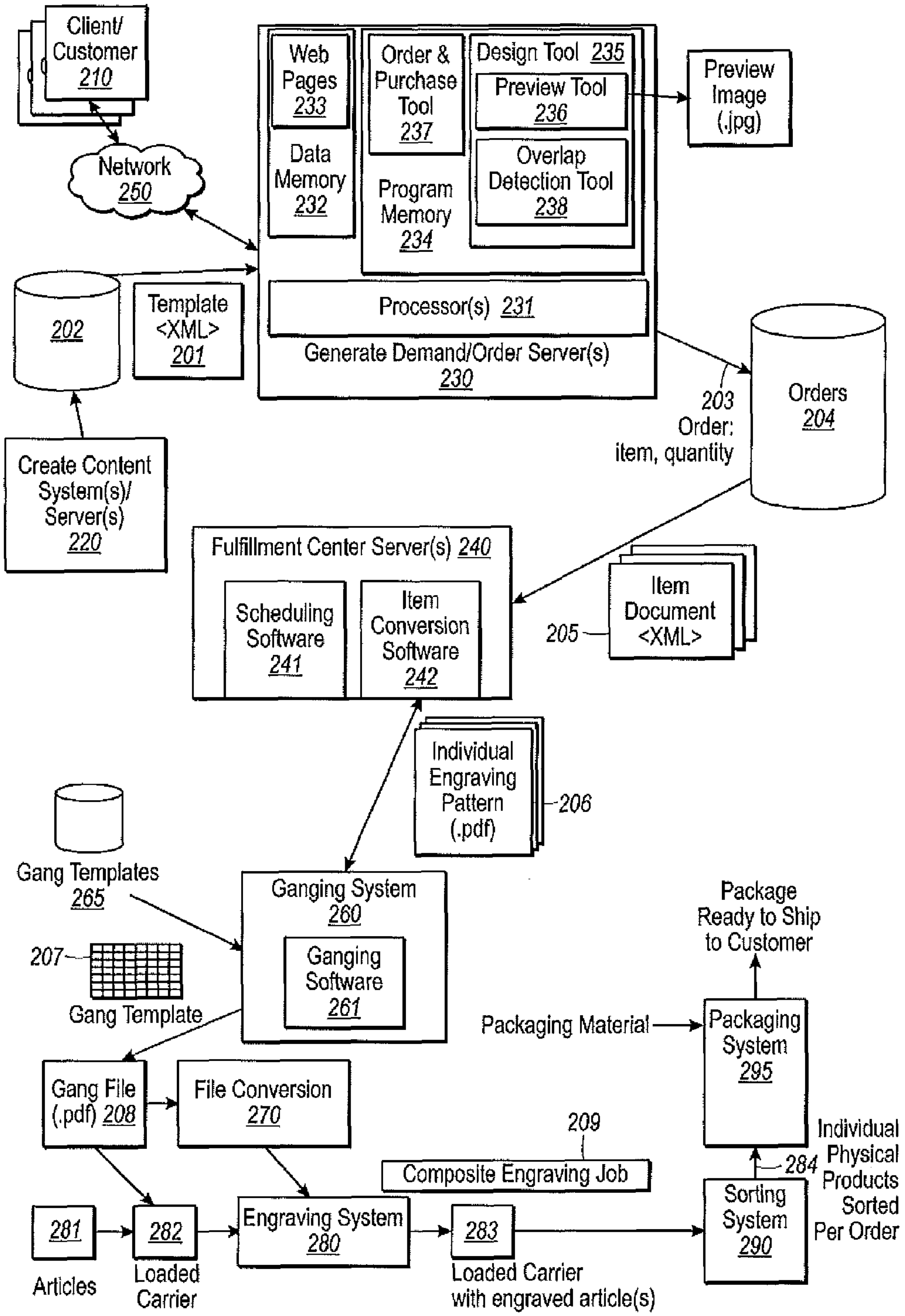
FIG. 2 is a high-level block diagram of an online retail system for customizing and simultaneously engraving multiple articles of manufacture.

A system embodying the model of FIG. 1 is shown in FIG. 2. A Create Content system 220, which may be implemented with one or more computer systems or servers (for example as described hereinafter in conjunction with FIG. 11), is used to receive, obtain, generate, and/or otherwise provision a Content database 202 with content such as template descriptions and associated engraving design/pattern descriptions usable by one or more Generate Demand/Order Pipeline servers 230 to customize and specify customer engraving orders. One or more computer systems (for example as described hereinafter in conjunction with FIG. 12) implement the Generate Demand/Order Pipeline servers 230 to serve pages of an online retailer website in order to generate orders 204 from customers for articles of manufacture to be engraved. In an embodiment, the articles of manufacture may be engraved with engraving patterns selected and/or personalized by the customer. For example, the article of manufacture may be a plastic or metal pen or business card holder engraved with customer-selected, and optionally personalized, text and/or graphics. Orders 204 are received by one or more Fulfillment Center server(s) 240 and filled and engraved according to the specifications of the order.

Each of the Create Content component 101, the Generate Demand component 102, the Order Pipeline component 103, and Order Fulfillment component 104 requires its own implementation considerations. Turning first to the Create Content component 101, the Create Content component 101 encompasses the implementation of content that corresponds to engravings that can be edited and personalized by remote customers over a network 201 such as the Internet (and then subsequently ordered as engraved articles of manufacture). For any given article of manufacture, one or more templates are generated by a human designer (typically operating a design tool 214 implemented as software executed by one or more computer processors such on one or more servers 220), or alternatively, a template may be designed and generated automatically by software.

Figure 3:
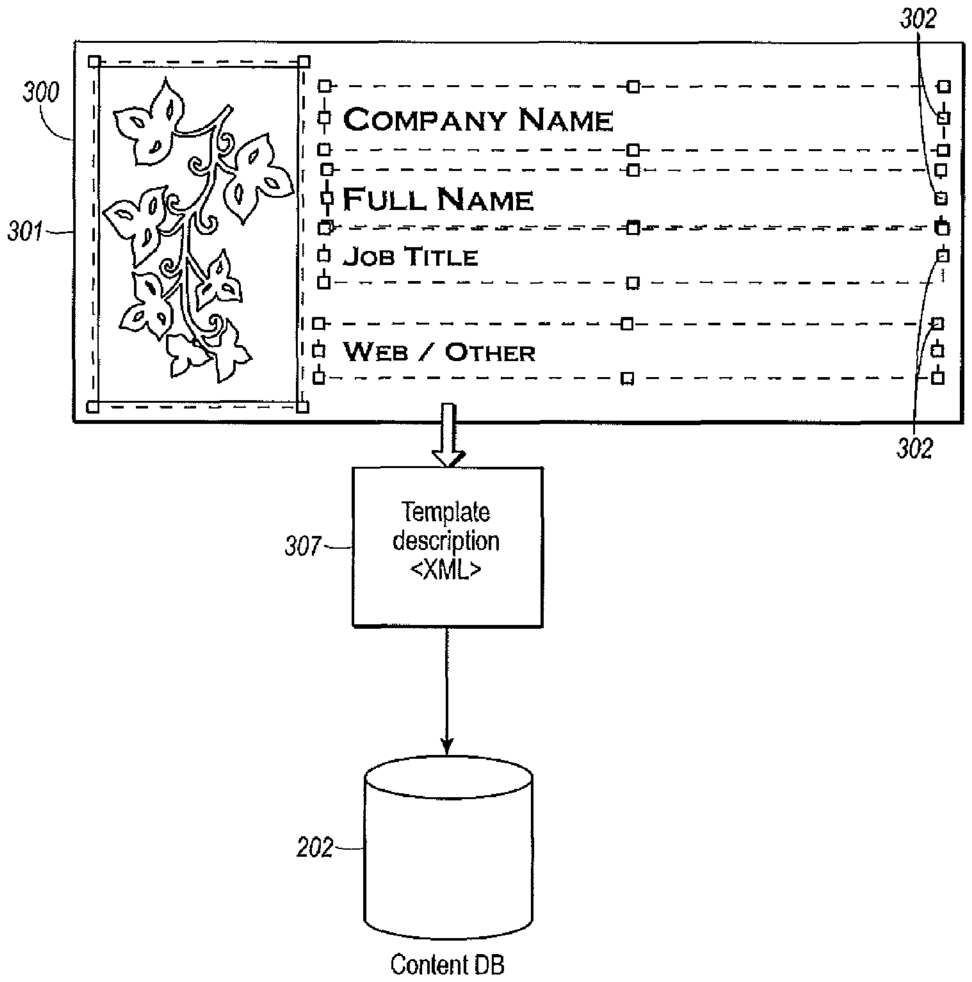
FIG. 3 is an operational diagram illustrating an engraving design template.

FIG. 3 shows an example business card holder template 300. As illustrated, a template 300 may includes a graphic (in this case a graphic of a house), and one or more editable content areas 302 that allow a customer to personalize with their specific information. For example, a template 300 for a business card holder as shown in FIG. 3 may include a non-editable graphic 301 and one or more editable text containers 302 which can be edited by a customer to fill in their own text.

Each article of manufacture is engraved in a targeted engraving area of predefined dimensions. In an embodiment, the components 301 and 302 are combined with a layout component that defines the positions of each of the components within an area corresponding to a targeted engraving area of a particular article of manufacture. For example, if the article of manufacture is a business card holder, the targeted engraving area dimensions may be of a predefined size. Furthermore, the targeted engraving area is specified to be in a predefined position on the article of manufacture. The template 300 is described in a template description 307 and is stored in a content database 202 preferably in a markup language format such as eXtensible Markup Language (XML) that can be processed by a web browser to render an image of the template on a computer display screen.

The stored content 202 (i.e., template description files 307 and associated components 301, 302) may be provisioned to a server 230 hosting a website. In one embodiment, as illustrated in FIG. 2, the Generate Demand/Order pipeline server 230 serves web pages 233 implementing the retailer's website to customers operating client computer systems 210. A customer interacts with the website through a browser 213 executing from program memory 212 under the control of one or more processors 211. The design and order process is conducted through the website.

Figure 4A:
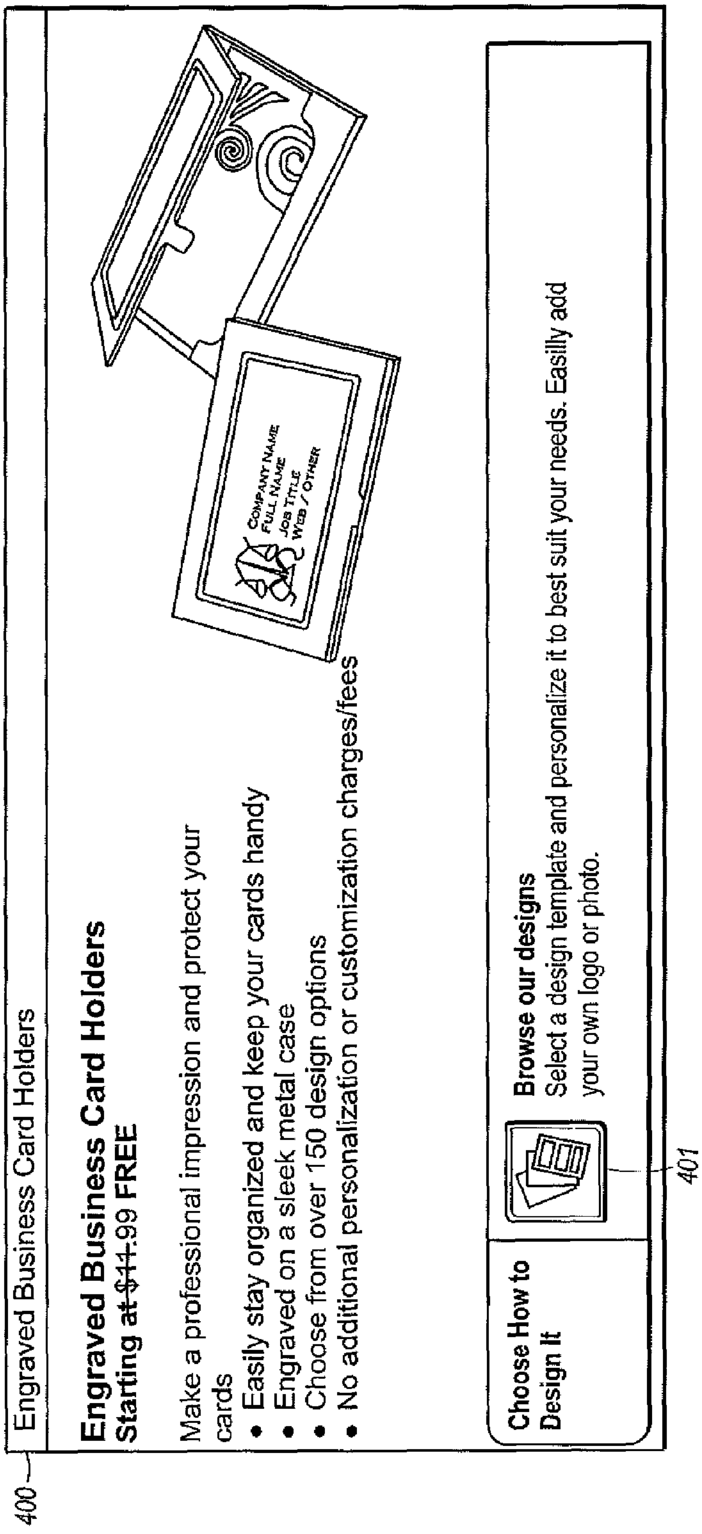
FIGS. 4A-4H illustrates exemplary web pages displayed to a customer during selection and customization of an engraving design to be engraved on a product.
Figure 4B:
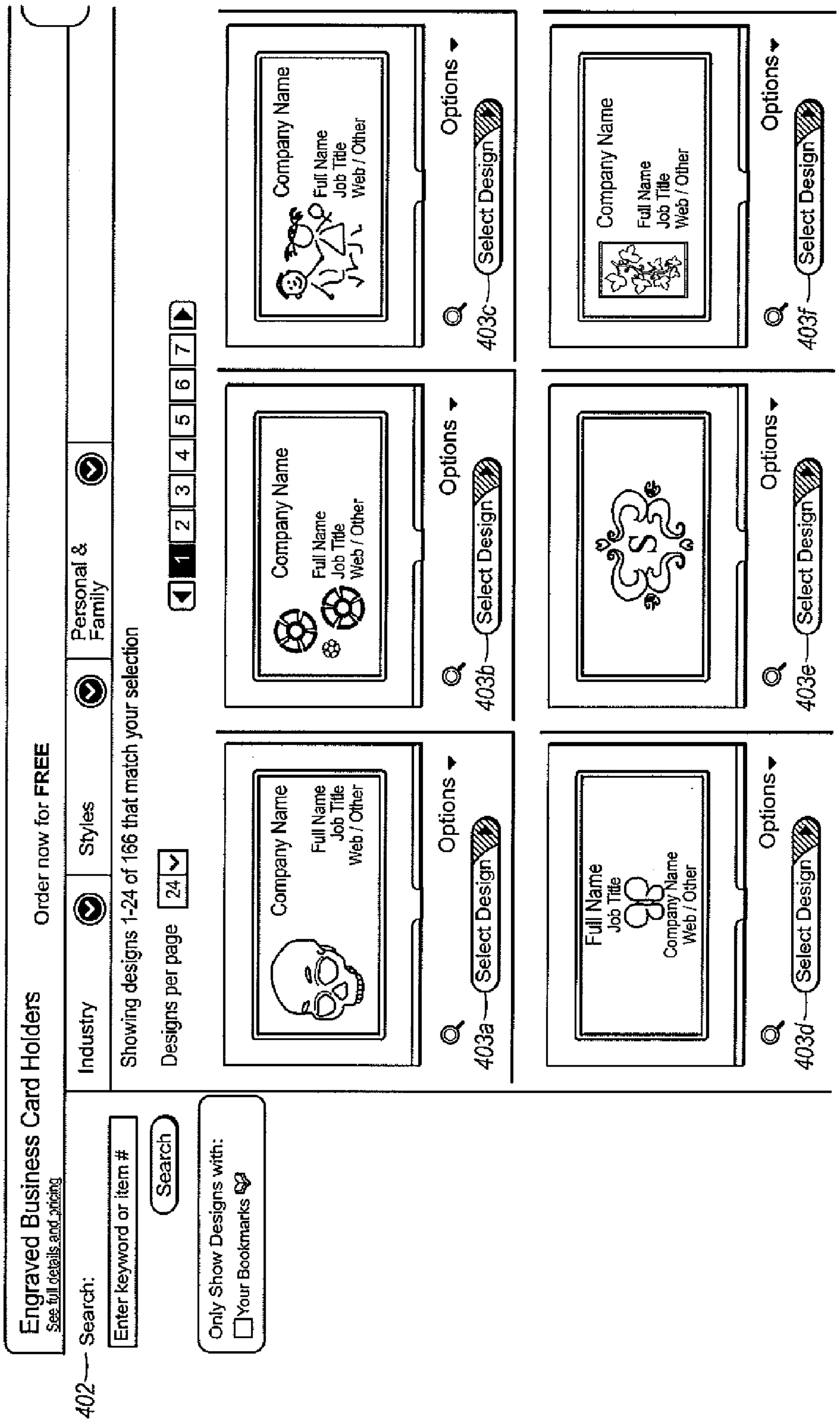

FIGS. 4A-4G illustrate a sequence of web pages 233 that may be presented to a customer and served by the Order server(s) 230 during the process of ordering a customized engraved business card holder by a customer operating a client computer 210. FIG. 4A shows an introductory web page 400 advertising the business card holders and inviting the customer to browse designs, via link 401, that may be engraved on the business card holders. FIG. 4B shows a gallery of engraving designs that may be selected by the customer to engrave on a pen. Engraving designs that include customizable text are shown with sample text content to represent how the pattern will look when engraved on the pen. The customer may select one of the designs by clicking on a corresponding link 403*a*, 403*b*, 403*c*, 403*d*, 403*e*, 403*f*.

Figure 4C:
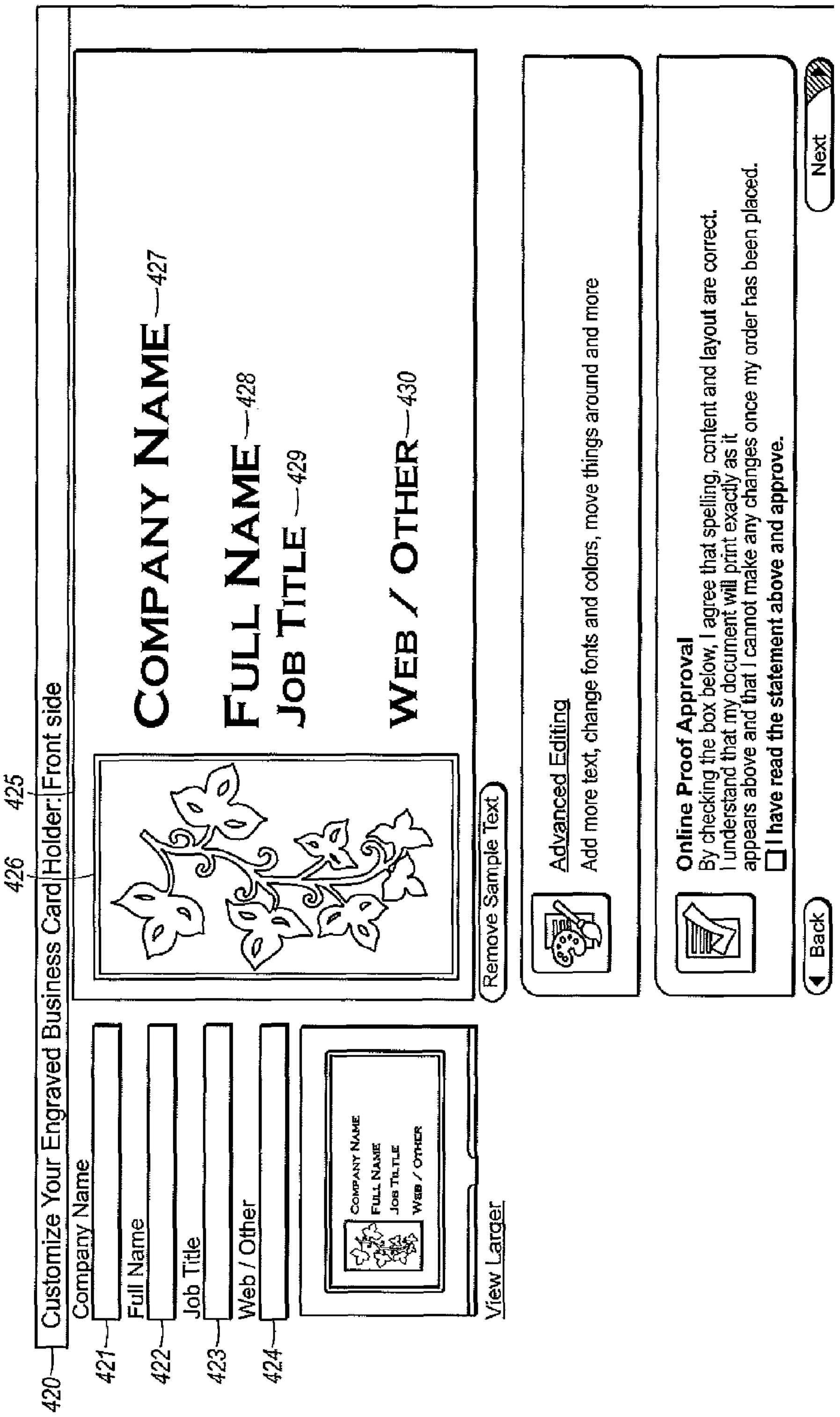
Figure 4D:
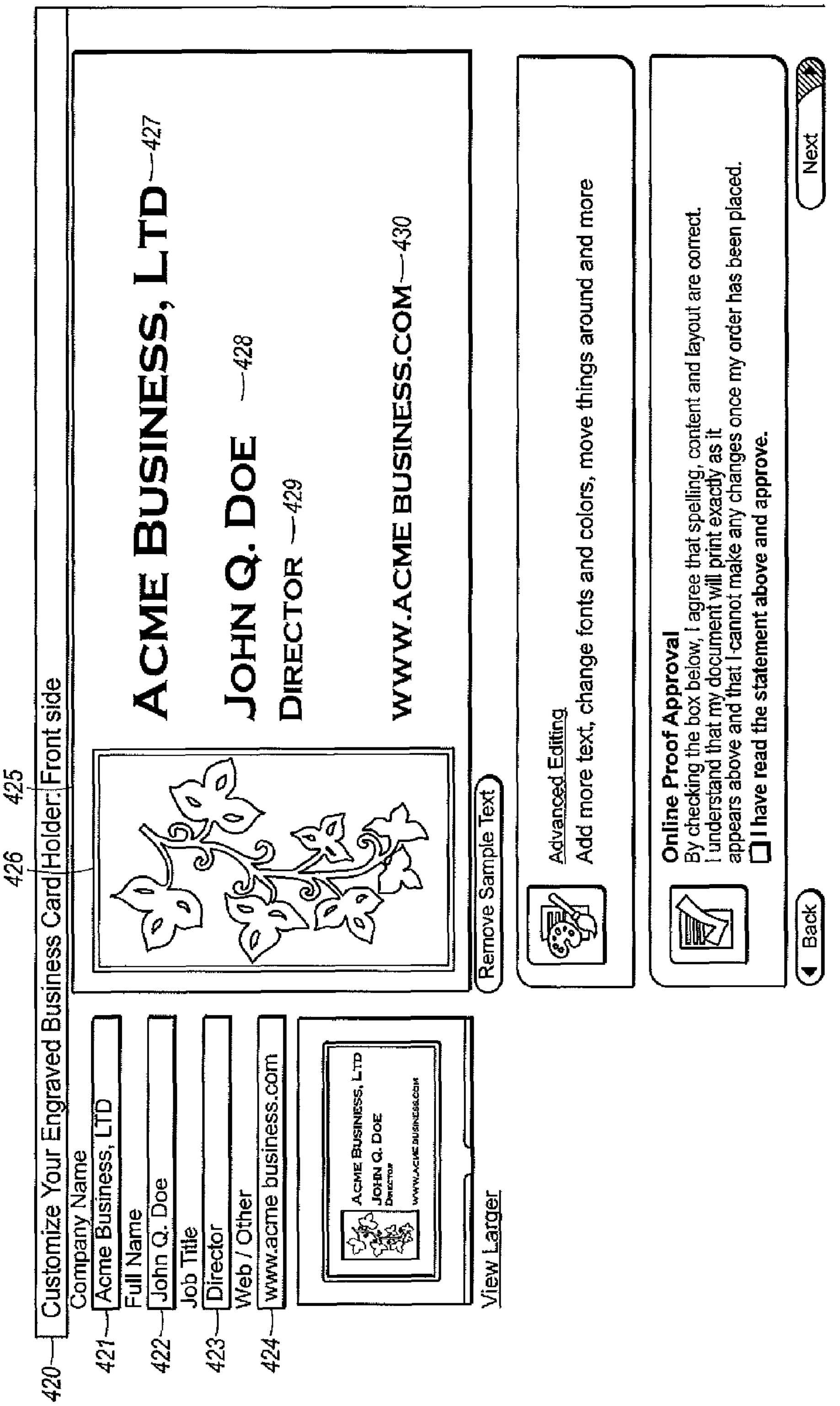

FIG. 4C shows a web page 420 presented to a customer after the customer has selected one of the engraving designs (via link 403*f*) from the gallery. In the example shown, the customer has selected an engraving design having a graphical design (climbing ivy pattern) 426 and customizable text fields 427-430 to allow the customer to insert a company name, individual name, Job Title, and Phone/Web address (or other text) specific to the customer. The web page 420 includes an image of a business card holder 425 engraved with the sample text and graphical image. The web page also includes text entry boxes 421-424 where the customer can enter text to replace the sample text. FIG. 4D shows the web page 420 presented to the user after the user has inserted text for the company name, individual name, job title, and web/other field into the corresponding text entry boxes 421-424. As illustrated, in this embodiment, the image of the engraved business card holder has been updated to show how the business card holder and engraving will appear in the final product. In an embodiment, the user-inserted text in the text entry boxes 421-424 is returned to the server for conversion to an image and returned to the client computer for display in the user's browser. Alternatively, the user-entered text could be rendered directly by the design tool(s) 235 executing in the client browser.

Figure 4E:
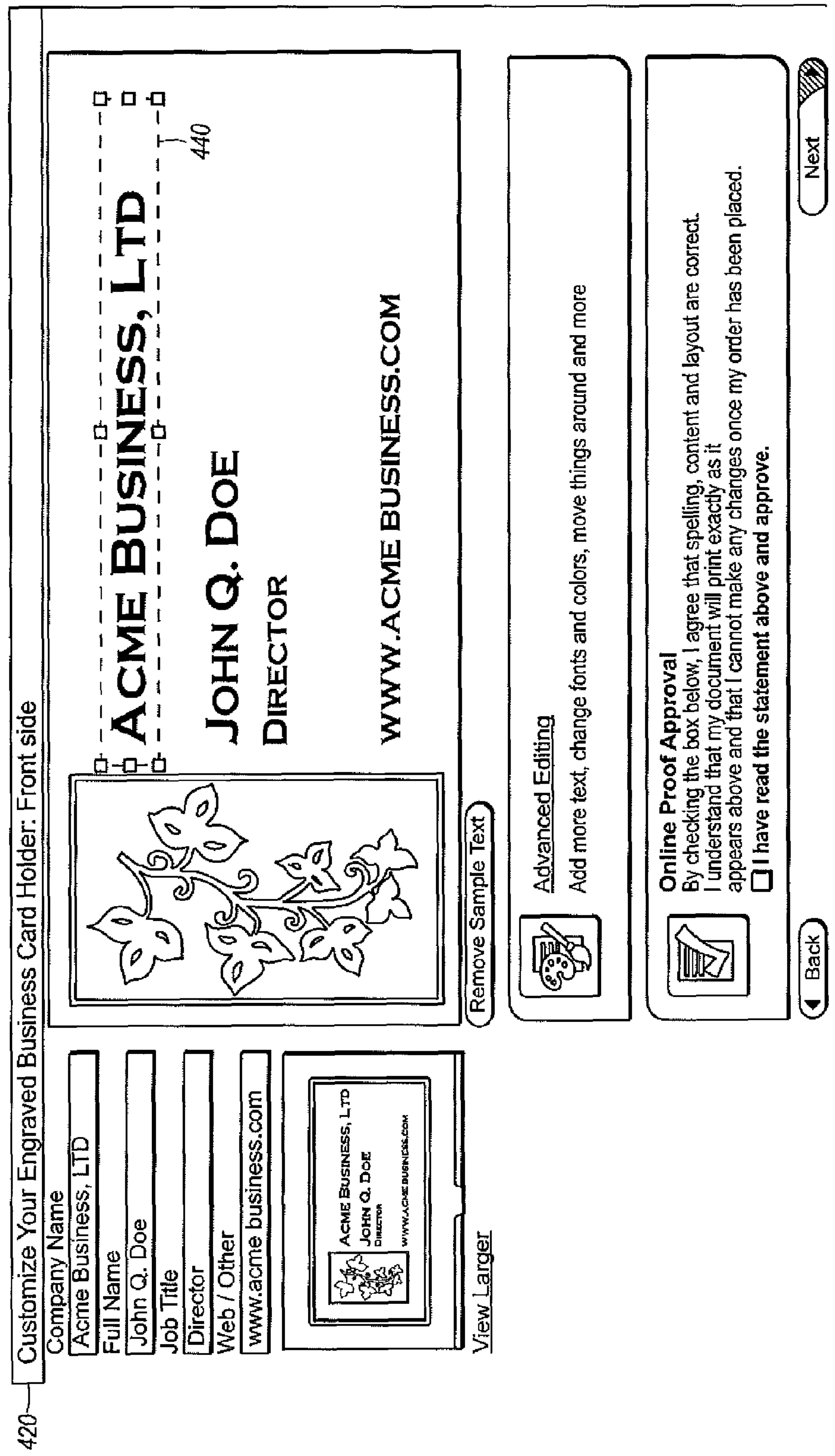

In an embodiment, the design tool(s) 235 made available to the user via the customer's browser may allow the customer flexibility in positioning the text and graphic components of the engraving design. For example, the design tool(s) 235 made available to the user may allow the user to change the font of the text (see 428 in FIG. 4F) or move the text and/or graphic components of the design around within the targeted engraving area of the article (see FIGS. 4E and 4F). Since in the exemplary embodiment each of the text and graphic components that make up the design template are is separate <XML>-defined components, user edits to any of the components is easily performed and the final composite design (i.e., <XML> document defining the customer's engraving design) is easily updated. For example, the user may wish to move the text component containing the text "Acme Business, LTD" to a different position in the targeted engraving area. FIG. 4E shows the web page 420 displayed to a customer after the customer has selected the text component containing the company name text "Acme Business, LTD", as indicated by the dotted line 440 around the text container and the handles (small squares) at the corners and midpoints of the container outline. Selection of the text component allows the customer to move the position of the text container and/or change the size and shape of the text container using the handles. FIG. 15F shows the selected text component 440 after the selected text component in FIG. 15E has been moved to a new position that happens to overlap the graphic component 426. In an exemplary embodiment, such movement or any other customer-directed changes results to an update to the <XML> definition of the particular component in the customized <XML> document representing the user's customized design.

Figure 4F:
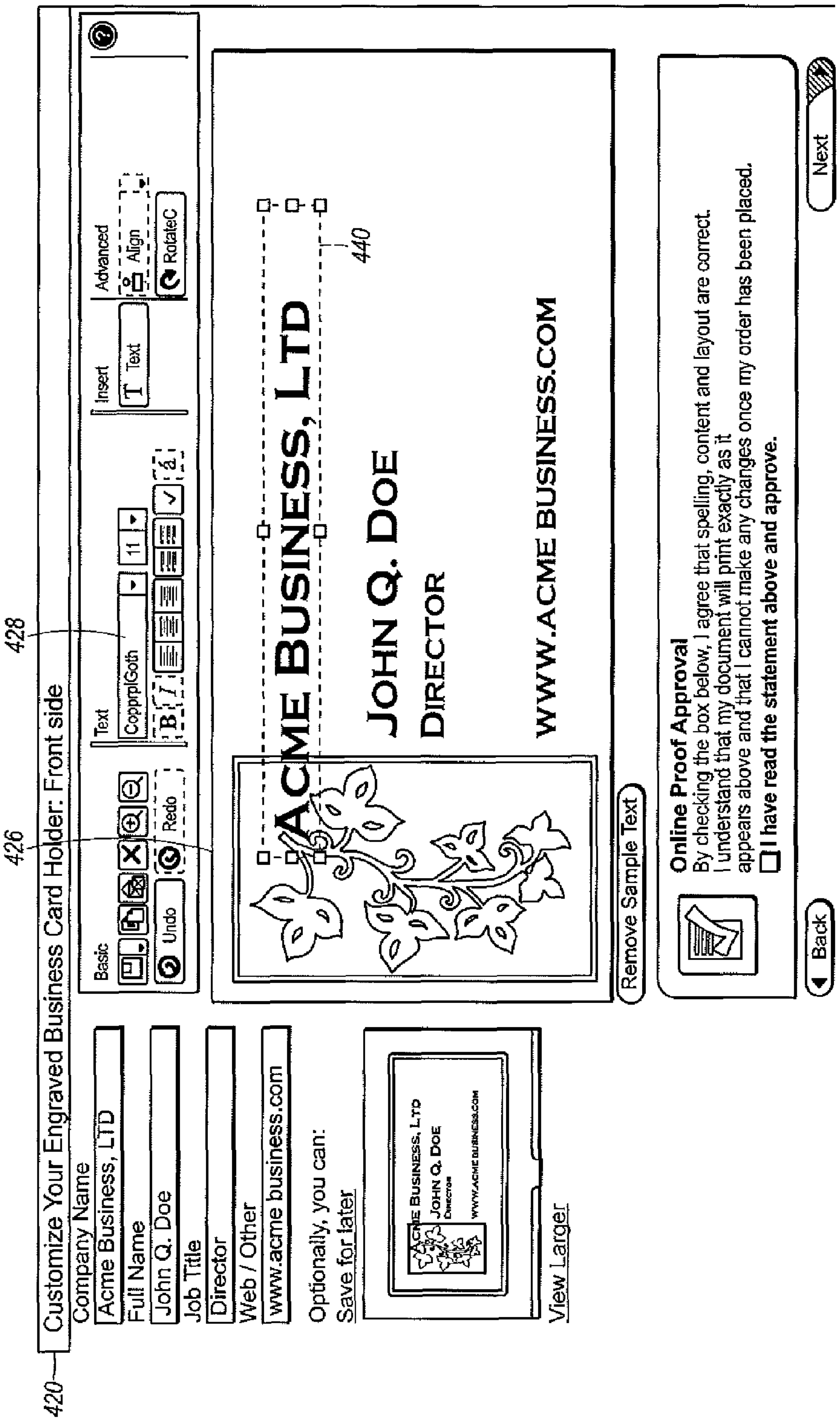
Figure 4G:
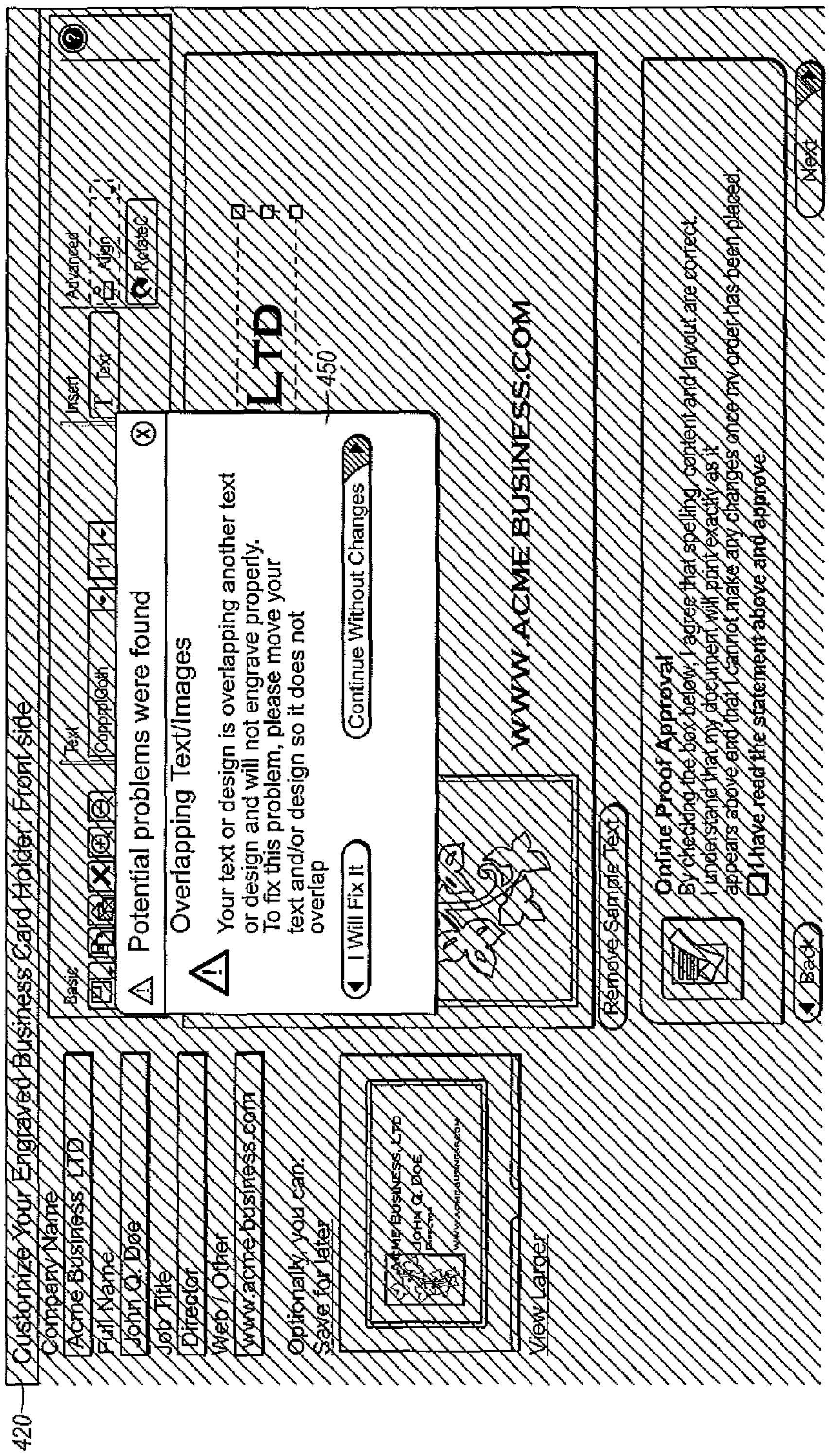

During the engraving process, the engraving mechanism (e.g., mechanical bit or laser) makes a deep cut while engraving the outline of a design, and a more shallow cut while filling in (hashing) the inside. If any of the individual components 426-430 of the design overlaps another, this can cause the appearance of the engraved article to be unexpected or less ascetically pleasing. For example, in an embodiment where the engraving design comprises a .PDF file generated from individual text and graphic components (e.g., as specified in the <XML> document corresponding to a customer's ordered item), the individual components are converted to individual vector formulas. Each vector formula is engraved one at a time instead of the entire design being flattened. Because of this, the appearance of the final engraved pattern may not be as ascetically pleasing if portions of the pattern overlap. That is, this condition may result if a text component overlaps graphic component, for example as shown in FIG. 4F. In an embodiment, the design tool(s) are configured to detect a condition where the content of any of the individual components in the item document overlap one another. If an overlap of any of the components is detected, the design tool is configured to generate a modal dialog to warn the customer of the condition in order to validate the overlap and to allow the customer to change the position(s) of the components to avoid the overlap. FIG. 4G shows an example popup window 450 that is displayed to the customer upon detection of the overlap condition in the engraving pattern design of FIG. 4F. The customer may decide to move one or more of the components to remove the overlap, or may choose to keep the design as-is.

In an alternative embodiment, individual components (e.g., text, graphic, etc.) are prevented by the design tool(s) from overlapping one another.

In another alternative embodiment, the completed design is flattened prior to sending it to the engraving system.

In yet another embodiment, the modal dialog 450 is presented to the customer, and if the customer chooses to proceed with the design with the overlap therein, the final design is flattened prior to sending it to the engraving system.

Figure 5:
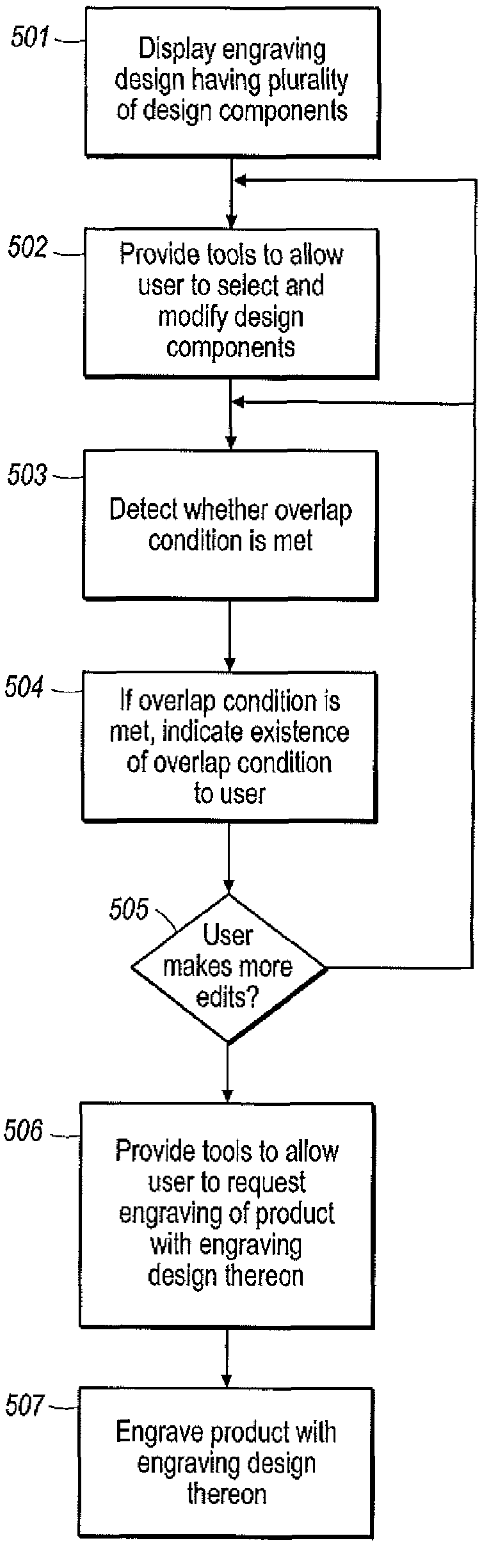
FIG. 5 is a flowchart illustrating an exemplary embodiment of a method for detecting undesirable overlay conditions in an engraving design.

FIG. 5 is a flowchart illustrating an exemplary method for detecting an overlap condition in an engraving design. The method includes the steps of displaying on a computer display an engraving design, the engraving design comprising a plurality of design components (step 501), providing one or more tools that allow the user to select one or more of the design components and to perform one or more operations comprising one or more of editing, re-positioning, and re-sizing of the selected one or more design components to produce a customized engraving design (step 502), detecting whether an overlap condition is met wherein content of any of the design components overlaps content of any other of the design components (step 503), providing an indication to the user that the overlap condition exists if the overlap condition is detected (step 504), allowing the user to perform another operation (such as editing, re-positioning, or re-sizing one or more of the components that may or may not result in correction of an overlap condition) (step 505), providing one or more tools that allow the user to request engraving of a product with the customized engraving design (step 506), and causing the engraving design to be engraved onto a product or other article of manufacture (step 507).

In an embodiment, detection of an overlap condition is performed by considering the entire engraving design as a grid of pixels. Each text or graphic component is implemented in a transparent container. When text or graphic content is inserted into the container, only pixels of the container occupied by actual text or content are non-transparent. For each text or graphic component, the locations of each of its non-transparent pixels are recorded relative to the entire grid.

If any particular pixel location is recorded more than once (i.e., the algorithm attempts to record the location of a non-transparent pixel that has previously been recorded), that must mean that content from another text or graphic component exists at that location, so there's an overlap. The presence of content at a particular pixel can be determined by the alpha (transparency) value of the pixel.

A fully transparent container has by default an alpha value of 0. Visible content has an alpha value greater than 0.

Figure 4H:
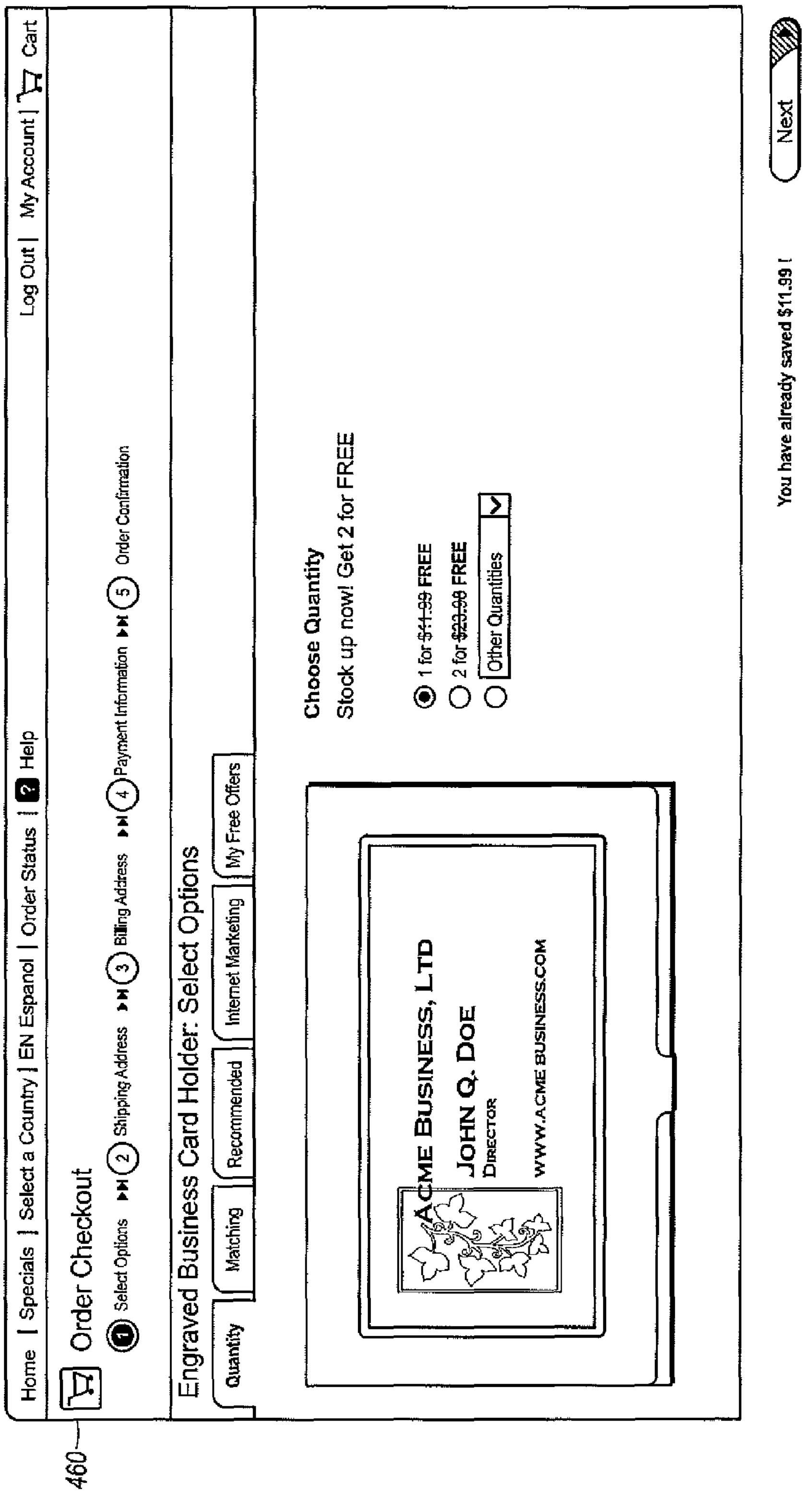

Returning to FIGS. 4A-4H, and in particular FIG. 4G, the user may choose to heed the overlap warning message by making changes to the design to correct the overlap condition using the editing tools of the design tools, or may choose to proceed with the design as-is. Once the user is satisfied with the design, the user may be presented with a checkout process, for example as begun in FIG. 4H. Web-based checkout procedures are well-known in the art.

Figure 6:
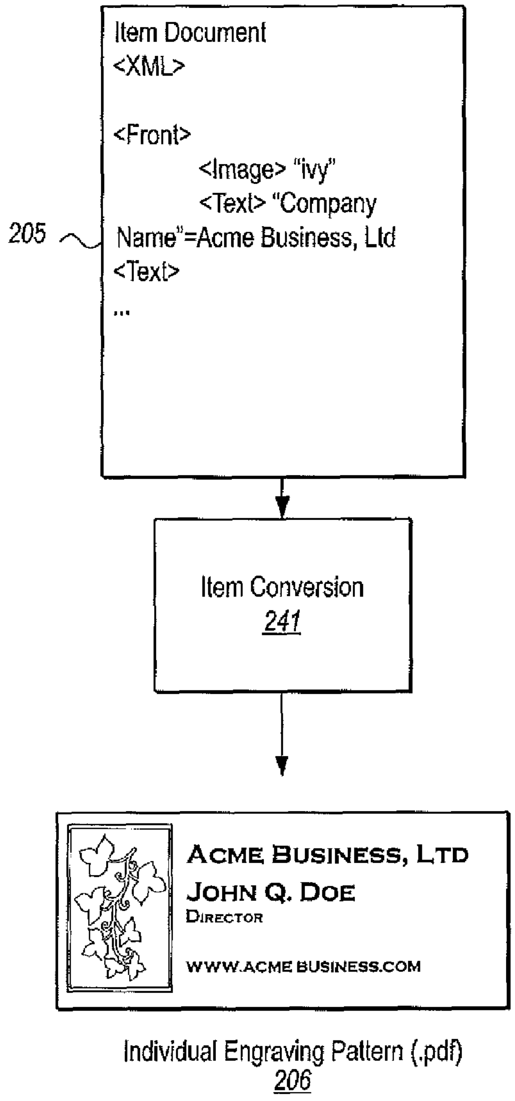
FIG. 6 is a diagram illustrating the conversion of a customized browser-renderable document into a postscript individual engraving design file.

FIG. 6 diagrammatically represents an exemplary embodiment of the operation of the item conversion software 241. In this embodiment, the item conversion software 241 receives an item document 205 in an XML format, and renders it into an individual engraving design file 206 such as .pdf or other Postscript file.

Returning to FIG. 2, a ganging system 260 executing job aggregation, or "ganging" software 261, automatically aggregates, or "gangs together" respective individual engraving design files 702 (e.g., .pdf files) associated with the ordered items to be engraved with multiple other items to be engraved and which may be associated with potentially multiple other customer orders, to produce a gang file 208. The gang file 208 contains the individual engraving designs of multiple different items to be simultaneously processed by the engraving system as a single engraving job.

A "gang" is a grouping of individual engraving designs that can all be processed together by the engraving system to engrave multiple different articles in a single engraving job. The process of choosing which individual engraving designs are part of a gang is called "ganging." Ganging leads to efficiencies on equipment with high setup costs and low run costs. It spreads the setup cost of a print and cut job across many orders.

Gangs are generated by the ganging system 260 by filling up gang templates 265. The layout of a gang will depend on the type and size of the articles, the positions of the articles when processed by the engraving system, and the positions of the targeted engraving area(s) on the articles to be engraved.

Figure 7C:
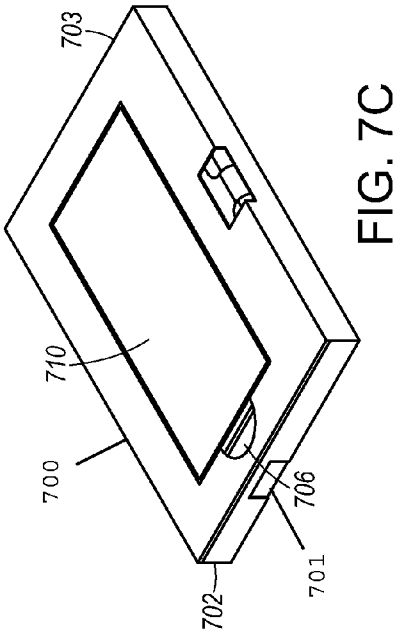
FIG. 7C is an isometric view of the packaged business card holder of FIG. 7B with the removable cover removed.
Figure 7D:
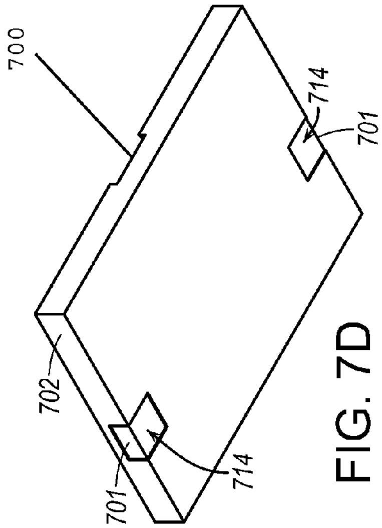
FIG. 7D is an opposite angle isometric view of the packaged business card holder of FIGS. 7B and 7C showing the bottom of the package and alignment cutouts.
Figure 7A:
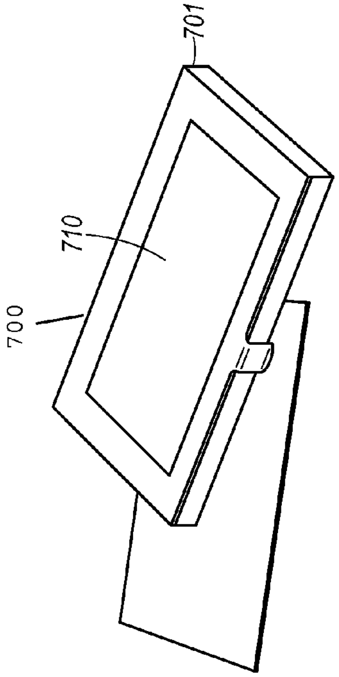
FIG. 7A is an isometric view of an exemplary embodiment of a business card holder that may be engraved.
Figure 7B:
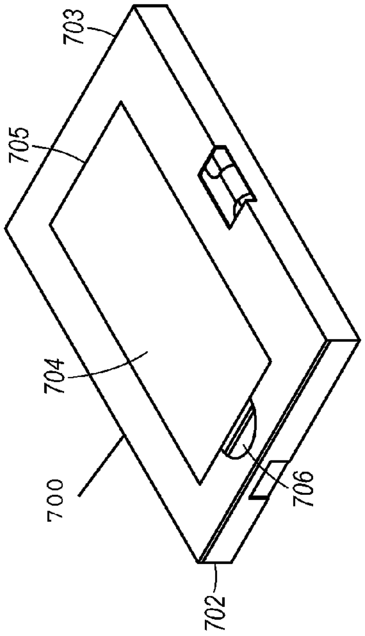
FIG. 7B is an isometric view of the business card holder of FIG. 7A that is packaged in packaging having a removable cover.

For example, in an embodiment, the articles of manufacture to be engraved in a single engraving job are business card holders (plastic or metallic), such as shown at 700 in FIG. 7A. For purposes of illustration of additional features of the inventions described herein, the business card holder 700 may be processed while still in its packaging 702, as illustrated in FIG. 7B. For example, in some retail environments, the business card holder may be sold plain (without engraving) or engraved. When a business card holder is ordered plain, it may be contained in packaging when it arrives at the retailer. If it is to be resold in its non-engraved condition, then it may be desirable from the standpoint of the retailer, for purposes of both efficiency and cost-savings, to retain the original packaging. Retention of the original packaging also assists in protecting the surfaces of the business card holder prior to delivery to the end customer However, when the business card holder 700 is to be engraved, access to the targeted engraving area 710 must be provided to allow the engraving system to engrave the engraving design on the business card holder 700. In order to accommodate both needs, a novel packaging 702 is utilized which protects the body 701 of the business card holder 700 or other article of manufacture while providing a removable cover 704 which covers the targeted engraving area 710 prior to removal and which provides access to the targeted engraving area 710 of the article stored therein by the engraving machine when removed. In an embodiment, the removable cover 704 of the packaging 702 is initially formed integral to the body 703 of the packaging. The integrity of the connection 705 between the removable cover 704 and the body 703 of the packaging 702 is somewhat tenuous in that it is designed to give way upon pressure or other force. For example, in an exemplary embodiment, the removable cover 704 is a portion of the original packaging 702 that is perforated 705 so that when a human or a mechanical device pulls the removable cover 704, the removable cover 704 tears easily away from the body 703 of the packaging 702 to reveal the targeted engraving area 710 of the article of manufacture therein. The removable cover 704 is preferably the same dimensions as the targeted engraving area 710 so that only the targeted engraving area 710 is revealed upon removal of the cover 704. In an embodiment, the removable cover 704 includes a tab (not shown), or alternatively the removable cover or package body includes a package recess 706 has shown in FIGS. 7B and 7C), to allow the removing party (human or mechanical) to easily grip the cover 704 to pull it off.

FIG. 7C illustrates the business card holder 701 within its packaging 702 after the removable cover 704 has been removed. As illustrated, the targeted engraving area 710 is accessible through the body 703 of the packaging 702.

Figure 8A:
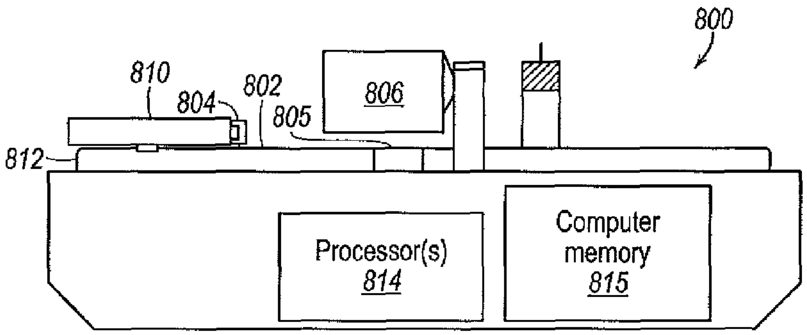
FIGS. 8A and 8B are a side view and isometric view, respectively, of a laser engraving system in accordance with an embodiment of the invention.
Figure 8B:
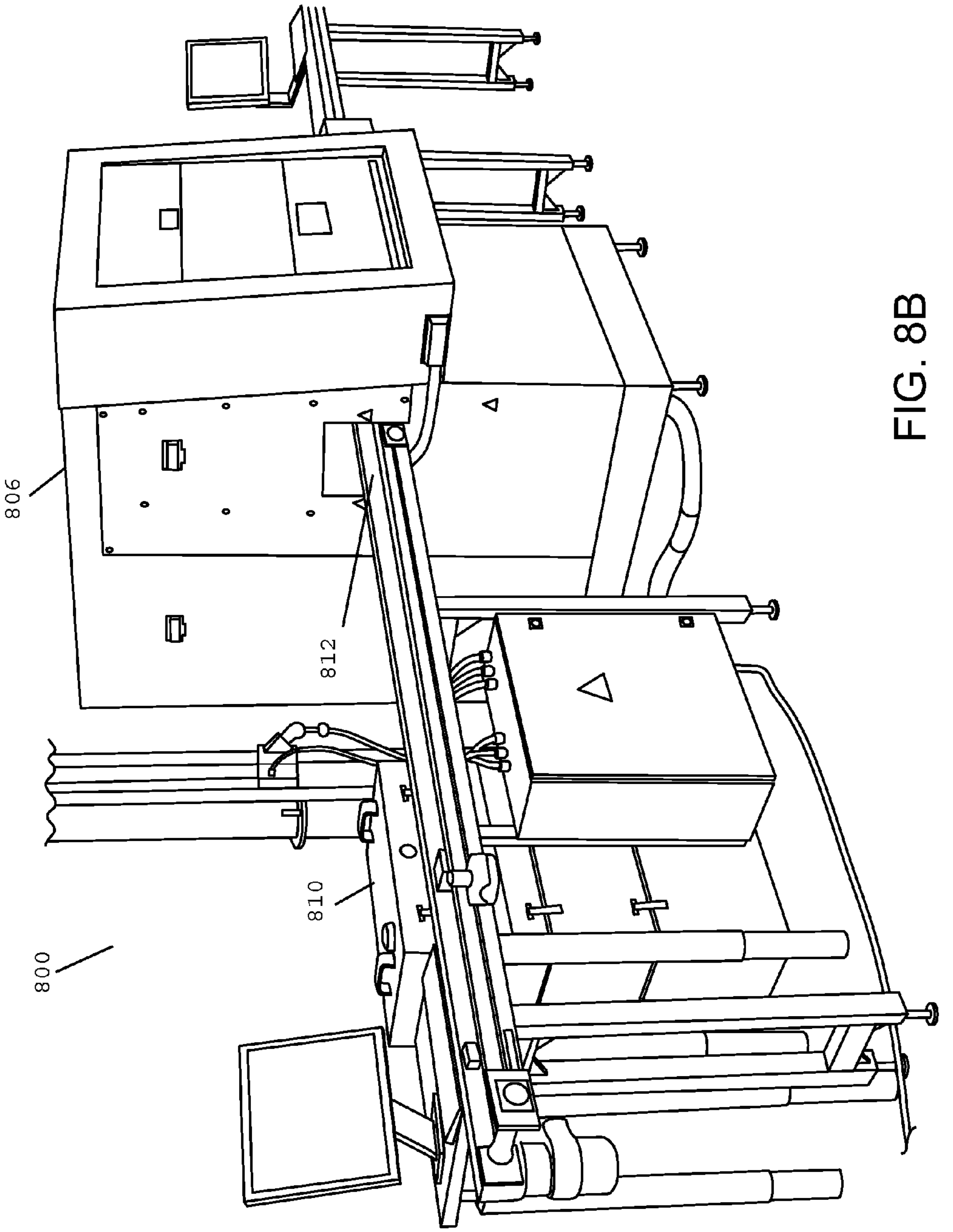

Prior to discussion how multiple articles of manufacture are engraved in a single engraving job, a discussion of the engraving system 280 will now be presented. Referring to FIGS. 8A and 8B, there is illustrated therein an exemplary embodiment of a laser engraving system 800 for engraving customized content on articles of manufacture, such as business card holders, pens, etc. As illustrated therein, the laser engraving system 800 includes an engraving table 802 having a carrier 804 mounted thereon for holding one or more articles 810 to be engraved. The laser engraving system 800 also includes one or more laser devices 806 that are configured to engrave articles positioned within an engraving space called an engraving station 805, one or more processors 814, and memory 815 for storing data and program instructions readable by the processor(s) 814. In one embodiment, the engraving table 802 is fixed within the engraving station 805 such that articles 810 mounted thereon are engravable by the laser device(s) 806. In an alternative embodiment, the engraving table 802 may be mounted on a conveyance system 812 which conveys the engraving table 802 along a pre-determined path through the engraving station 805, where it is positioned in place or conveyed past the output laser beam(s) of the laser device(s) 806. If a conveyance system 812 is employed, the conveyance system 812 may be any automated or manual means for conveying the engraving table 802 along the pre-determined path. For example, in one embodiment, the conveyance system 812 is an automated conveyor belt system under the control of a computer program. In another embodiment, the conveyance system 812 is a set of rollers over which the engraving table slides when manually guided by a human operator.

One or more processors 814 are coupled to the laser engraving system 800 for receiving a composite engraving job 209 including an engraving design file representing one or more individual engraving designs to be engraved on one or more articles, and for causing laser engraving of the individual engraving designs in the engraving design file on the one or more respective articles 810 mounted on the carrier 804. In particular, processor(s) 814 orchestrate the relative movement between the article(s) 810 being engraved and the laser device(s) 806. The job of the processor(s) 814 varies depending on the type of laser scanning performed by the system, but in general, the job of the processor(s) 814 is to instruct the relative positioning between the articles 810 being engraved and the laser device(s) 806, and the turning on and off of the laser beam(s), to engrave the received pattern on the article(s) when the article(s) are moved into the engraving station.

One or more of the processor(s) 814, memory, and instructions stored therein that direct the relative movement between the laser beam(s) and article(s) to be engraved are together referred to herein as the "scanning system" of the laser engraving machine 800. In one embodiment, the scanning system is a flatbed scanning system which spot lasers a rasterized image onto an article positioned on a 2-dimensional (X-Y) focal plane, left-to-right, line-by-line. In a flatbed scanning system, one or the other, or both of the article and the laser beam moves. In one embodiment, the article moves the Y axis and the laser moves in the X axis.

In another embodiment, the scanning system is directed at engraving cylindrical articles, wherein the laser traverses a fine helix and spot lasers the desired image onto the article on a raster basis.

In yet another embodiment, a galvo scanning system is utilized, wherein the article and the laser device remain stationary, and galvonometers are used to control the position of mirrors, and consequently the laser beam, to direct the laser beam at the target. Galvo scanning systems can operate in either a raster mode or a vector mode. In raster mode, the engraving of the image is achieved by spot lasing, line-by-line, each pixel of the digital image. In vector mode, lines are defined according to start and end points and a curve, and the movement of the laser beam is coordinated to move along these lines.

For purposes of the present invention, the scanning system may be selected to operate in either of the raster or vector mode, and may be any of the above-mentioned types described herein or hereinafter developed.

After the engraving process is complete, the carrier 804 holding the article(s) 810 is removed from engraving station through either manual or automated means. If automated, in one embodiment, the processor 814 causes the engraving table 802 to convey the article(s) 810 on the carrier 804 past the engraving station to an unloading area.

In an exemplary embodiment, the engraving system is a laser engraving system. As known in the industry, a laser is a device that emits light (electromagnetic radiation) through a process called stimulated emission. A laser device includes a gain medium inside a highly reflective optical cavity, as well as a means to supply energy to the gain medium. The gain medium is a material with properties that allow it to amplify light by stimulated emission. Generally, the laser includes a gain medium and at least two reflectors (e.g., mirrors) arranged such that electromagnetic radiation (also referred to generally herein as "light") of a specific wavelength reflects back and forth repeatedly through the gain medium, increasing power with each amplification. Typically one of the mirrors, called the output coupler, is partially transparent and is configured to transmit a low-divergence beam of electromagnetic radiation characterized by waves of identical wavelength (i.e., the characteristic wavelength of the laser device), phase and polarization. The output beam is referred to in places in this application as a "laser beam".

The laser engraving process utilizes a laser beam to mark a visible layer, and therefore the optical appearance, of a targeted area of an article. This can occur through a variety of mechanisms, including ablation of material, removal of material, carbonization, pigment transformation, polymer expansion, and surface structure generation. The output beam of a laser may be continuous wave or pulsed wave. The light absorbed by the surface particles targeted by the laser beam is transformed into heat. For engraving applications, pulsed wave lasers are generally used to prevent damage to the article outside the targeted engraving area. With a pulsed laser, the light absorbed during the optical pulse is still transformed into heat, but for short time durations. The optical pulse creates a high instantaneous temperature rise in the material on a time scale very short compared to the thermal conduction time constant of the material being engraved, thus mitigating damage to the material surrounding the target. The pulse length of industrial lasers typically used for marking is in the range of 0.02-10 microseconds.

In order to engrave multiple articles of manufacture in a single engraving job, the carrier 804 must be designed to hold the multiple articles of manufacture in place with the targeted engraving areas of the articles accessible by the laser beam or other engraving means.

Figure 9A:
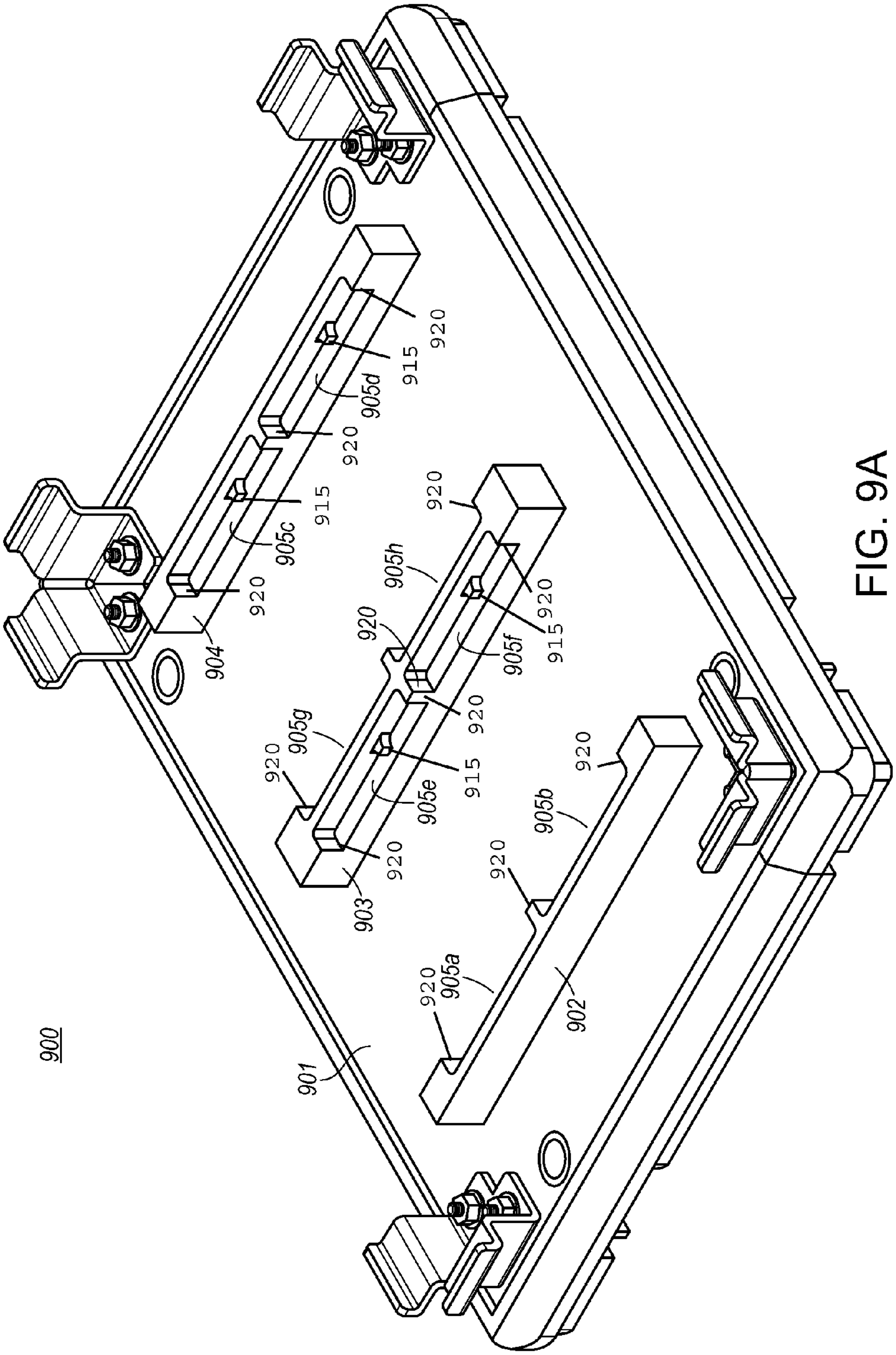
FIGS. 9A-9B show an isometric view and a top-down view of an empty business card holder carrier.
Figure 9B:
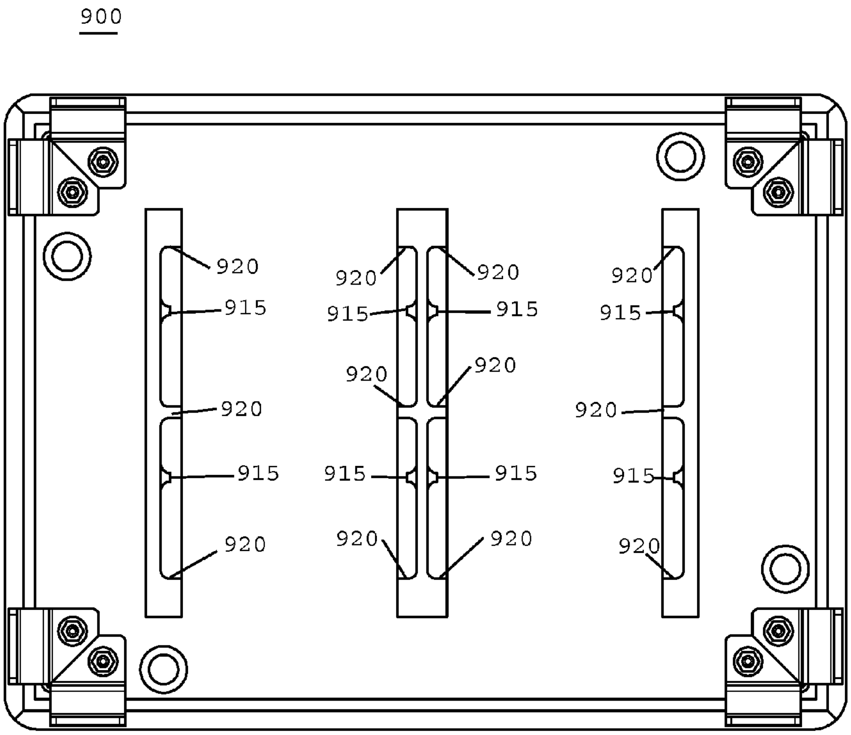

In the illustrative case of engraving business card holders, it would therefore be desirable to have a carrier that holds multiple business card holders that can be utilized with the engraving system 280/800. FIG. 9A depicts an exemplary embodiment of a business card holder carrier 900 for use in engraving systems. As illustrated in FIGS. 9A and 9B, the carrier 900 is configured to hold up to four business card holders 700. The carrier 900 includes a platen 901 on which a left rail 902, a middle rail 903, and a right rail 904 are mounted in parallel. The right and left rails are each configured with two seats 905*a*, 905*b*, 905*c*, 906*d* having a horizontal seat backed by a vertical back. The middle rail is configured with two seats on each side 905*e*, 905*f*, 905*g*, 905*h*. Each seat 905*a*-905*h* (referred to generally as 905) includes at least one respective prong 915, for reasons discussed hereinafter. The rails 902, 903, 904 are positioned in parallel such that the vertical walls of the seats 905 are separated by a distance that accommodates the width of the business card holder plus some additional distance for accommodating packaging and tolerance. When properly inserted in the carrier 900, one side of the business card holder 700 rests in the seat 905 of one rail and the other side of the business card holder rests in the seat 905 of the adjacent rail. The prongs 915 of the opposing seats 905 engage the sides of the business card holder 700 such that the business card holder 700 is aligned side to side (along an x-axis) within a designed tolerance. The seats 905 also have stops 920 to align the business card holder 700 along the y-axis. The alignment prongs 915 and stops 920 ensure that the targeted engraving areas 710 of the business card holders 700 are positioned identically from job to job and are within a know tolerance of a known location in the engraving area of the engraving station.

As previously described, in one embodiment, the business card holders 700 are engraved while still in the packaging 702 (with the removable cover 704 removed). In some cases the packaging 702 can interfere with the alignment of the business card holders 700 in the carrier 900 because they may be loose within the packaging. In an embodiment, as illustrated in FIG. 7D, the packaging is configured with cutouts 714 in positions that correspond to the position of the alignment prongs 915 in the carrier 900. This allows the alignment prongs 915 to engage the body 701 of the business card holder 700 itself (and not just the packaging 702) when the packaged business card holder is inserted into a position in the carrier 900. This ensures accurate x-axis alignment. In an embodiment, the y-axis alignment is sufficient even with the presence of the packaging. However, if needed, additional rails may be provided perpendicular to the rails shown in FIGS. 9A and 9B, along with corresponding alignment prongs 915, and corresponding packaging cutouts 714 may be implemented in the packaging 702 to allow engagement of the business card holder with additional alignment prongs of the carrier.

In an embodiment, articles of manufacture are packaged in packaging that includes one or more alignment cutouts corresponding to positions of alignment prongs in the carriers in which they will be mounted for engraving. In this embodiment, the articles are inserted into the carrier such that the alignment prongs of the carrier engage the articles of manufacture through corresponding cutouts in the packaging in which the article of manufacture is packaged.

FIG. 7D shows exemplary packaging 702 having cutouts 714 revealing the body 701 of the business card holder 700 in the places that correspond to the alignment prongs 915.

Figure 9C:
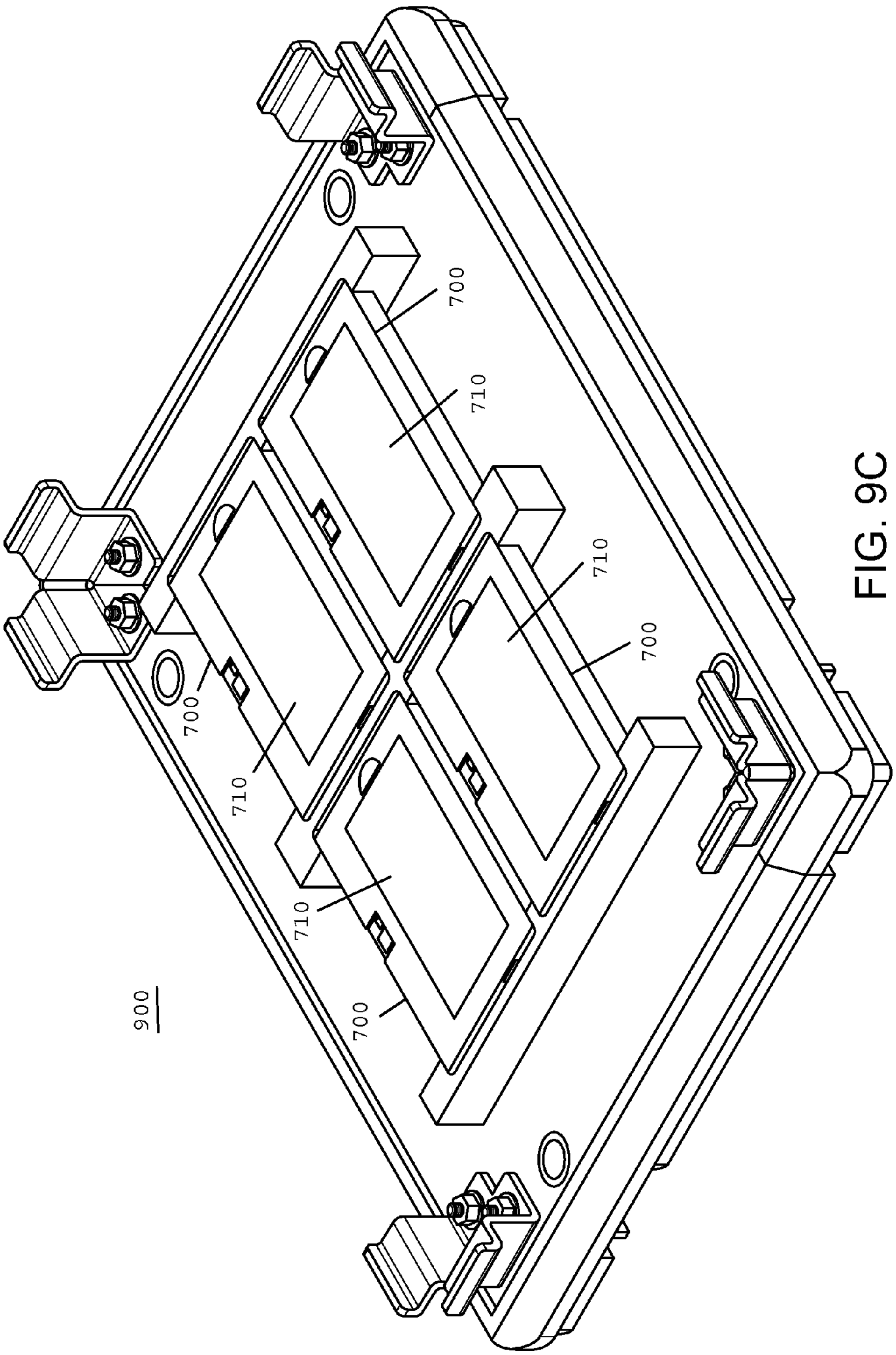
FIG. 9C shows an isometric view of the business card holder carrier of FIGS. 9A-9B loaded with business card holders.

FIG. 9C shows the carrier 900 with four business card holders loaded therein and the removable covers of the packaging 702 removed to reveal the targeted engraving areas 710 of the business card holders 700. As illustrated, the business card holders 700 are aligned along both the x- and y-axes.

Given a carrier that is fixed in the same position in the engraving station every time, and having fixed positions in the carrier for holding articles of manufacture in aligned position, a gang corresponding to the layout of the articles to be engraved can be constructed.

Figure 10A:
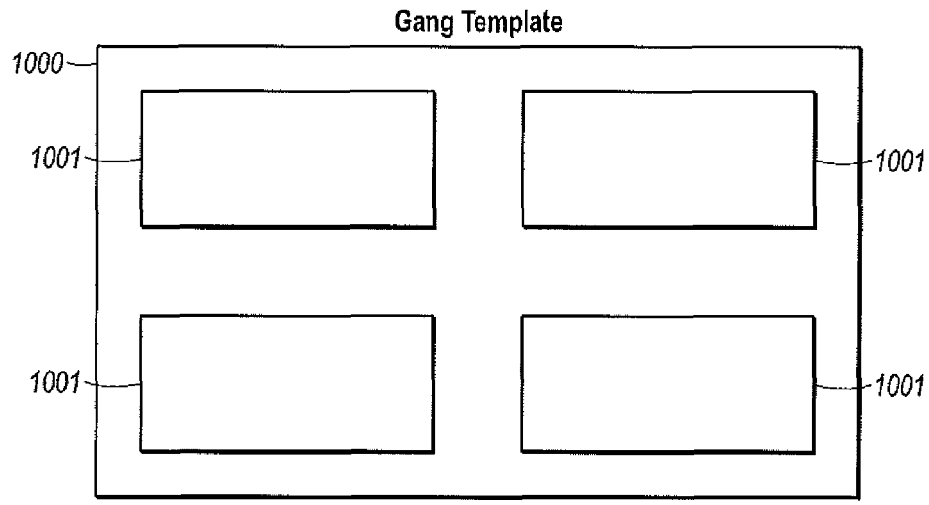
FIGS. 10A-10C show a business card holder gang template in various stages of fill.
Figure 10B:
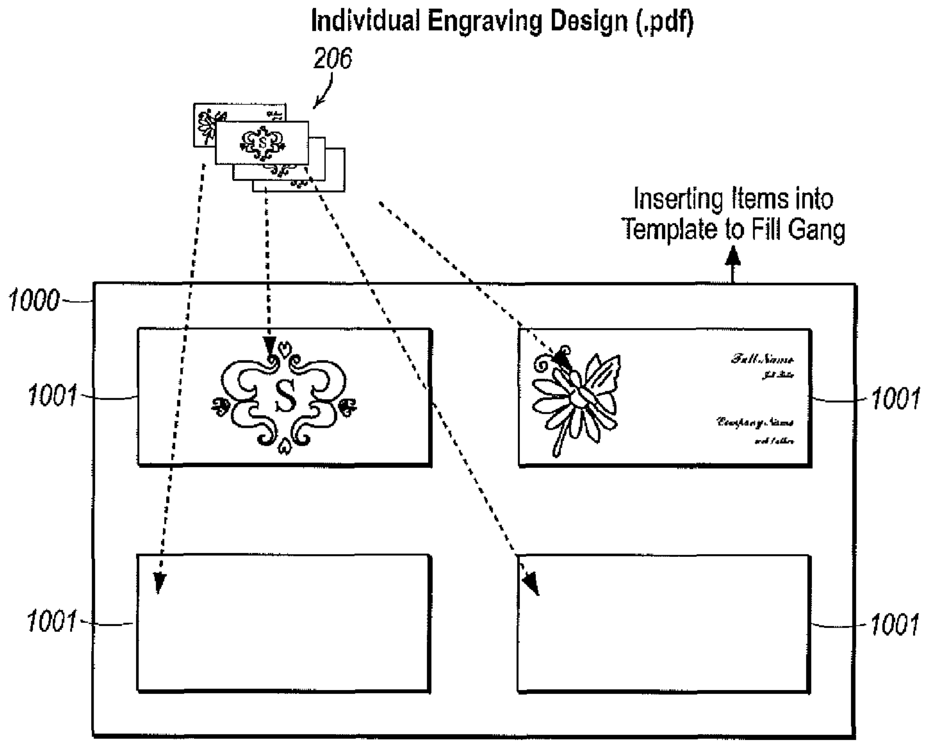
Figure 10C:
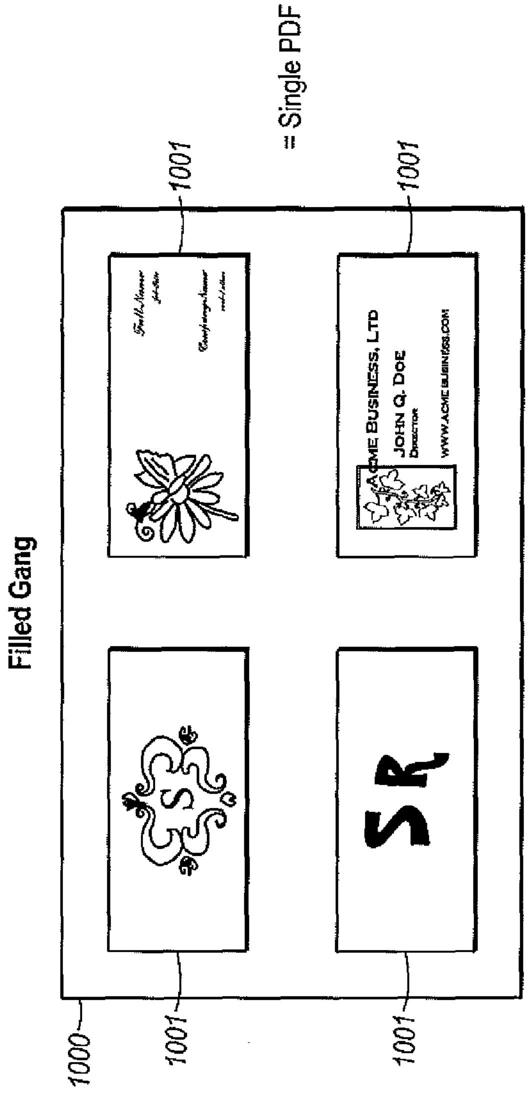

In an embodiment, and with reference to FIGS. 10A through 10C, individual engraving designs from individual orders are arranged in a layout according to a predefined gang template 1000. In an embodiment, the gang template 1000 is a postscript file such as a .pdf file defining a plurality of pre-positioned empty cells 1001. A cell 1001 is a content container of pre-defined dimensions corresponding to a position and dimensions of a targeted engraving area of an article mounted on the carrier 900 and positioned in the gang file layout in a unique pre-defined location in the gang template 1000. Each empty cell 1001 may be filled with a single PostScript individual engraving design 206.

In the examples shown in FIGS. 10A-10C, the gang template 1000 includes four cells 1001 of identical size arranged in 2 rows and 2 columns corresponding to the positions of the business card holders in the carrier. Each cell 1001 corresponds to a targeted engraving area on a business card holder. The cell layout shown in FIGS. 10A-10C is representative only and will vary across different types of articles, different targeted engraving areas on the articles, different numbers of articles accommodated by different carriers, etc. For example, in one embodiment (not shown), the carrier holds pens and accommodates 16 pens arranged in 8 rows by 2 columns. The carrier design is different, and the gang layout is different to correspond to the layout of the carrier and layout of the targeted engraving areas on the articles mounted in the carrier.

Referring back to FIG. 2, the cells 1001 in a gang template 1000 are filled according to an automated ganging algorithm, executed within the ganging system 260. The ganging system 260 selects a gang template 1000 appropriate to a particular product (e.g., a business card holder or a pen) and instantiates a gang template for that particular product. The ganging system 260 selects items scheduled for production and begins filling corresponding cells of the gang template 1000 with the corresponding individual engraving designs 206 until the gang is filled. If the ordered quantity of engraved articles associated with an individual engraving design is greater than one, then additional instances of the individual engraving design 206 may be placed in additional cells of the associated gang template 1000 to cause the ordered quantity of the item to be engraved.

The filled gang file 208 is sent to a format conversion system 270 which converts the gang file 208 into the format required by the engraving system. In an embodiment, the gang file 208 is a Postscript .pdf file, and the engraving system requires a vector format file. In alternative embodiments, the engraving system may receive a raster file which may be the same format as the gang file or a different format. The converted gang file (or simply the gang file is no conversion is required by the engraving system) is the composite engraving job 209 that is received by the engraving system. A carrier 282 is loaded with the appropriate articles to be engraved 281 and received by the engraving system 280 into its engraving station. The engraving system 280 engraves the articles loaded on the carrier according to the composite engraving job 209. The carrier with engraved articles 283 is then removed from the engraving system 280, and the engraved articles are removed from the carrier and sorted into individual orders by a human or a computerized sorting system 290. The sorted orders may then be packaged for shipping by a packaging system 295.

In an embodiment, one pattern may be engraved on the multiple articles. In this embodiment, the engraving pattern associated with the engraving job may comprise a single pattern, and the engraving job may include the engraving pattern representing a single pattern or include instructions or data for retrieving the engraving pattern, along with instructions for repeatedly engraving the pattern on multiple articles in a single engraving job. The processor(s) may receive the engraving job and retrieve the pattern and direct the scanning system to engrave the pattern at various locations corresponding to the respective targeted engraving areas of the articles on the carrier mounted on the engraving table. In this embodiment, the processor(s) must be configured with additional logic so as to instruct the direction of the laser beam to engrave the pattern multiple times in multiple locations within the engraving space (i.e., within the dimensions of the engraving table) of the engraving machine.

It will be noted that while identical individual engraving designs may be engraved on each article held on the carrier, potentially each cell can contain a different pattern. Furthermore, patterns corresponding to different customers and/or different engraving orders can be simultaneously engraved onto multiple different articles within the same engraving job that is sent to the engraving system.

Figure 11:
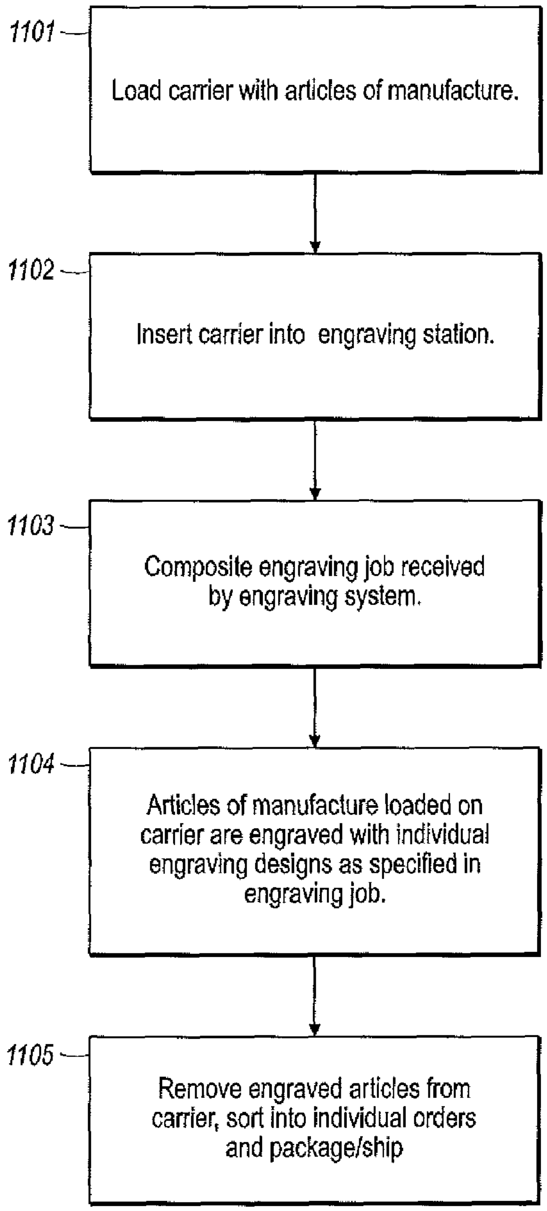
FIG. 11 is a flowchart of an exemplary embodiment for simultaneously engraving multiple articles of manufacture.

FIG. 11 illustrates an exemplary method for simultaneously engraving one or more individual engraving designs onto multiple articles of manufacture. In this method, a carrier implemented according to the principles of the invention, for example a carrier 900 implemented as in FIGS. 9A-9C, is loaded with articles of manufacture (step 1101). The carrier is inserted into an engraving station of a laser machine (step 1102). In an embodiment, the carrier is mounted on a transport mechanism which conveys the carrier to the engraving station for engraving of the articles. Meanwhile, the engraving system receives an engraving job having an specifically multiple individual patterns to be respectively engraved onto respective articles 200 loaded in the carrier (step 1103). In an embodiment, each of the individual engraving designs to be engraved onto each of the articles of manufacture is combined into a single image or vector file such that placement of the respective individual engraving design or corresponding vector instructions in the composite engraving design file corresponds to the placement of the corresponding article of manufacture (and targeted engraving area of the corresponding article of manufacture) on the carrier. Thus, given the composite engraving design file, the laser engraving system engraves all of the individual engraving designs onto the corresponding articles of manufacture through the processing of a single composite engraving design file, i.e., a single engraving job. In other words, the laser engraving system itself has no knowledge that it is engraving multiple articles of manufacture versus engraving a larger area on a single article.

The laser engraving system engraves the individual engraving designs contained in the composite engraving design file onto the multiple articles of manufacture loaded on the carrier (step 1104). Upon completion of the engraving job by the laser engraving machine, the carrier with engraved articles loaded thereon can be removed from the system 100 and transported to a packaging, labeling, or other station for further processing (step 1105).

Figure 12:
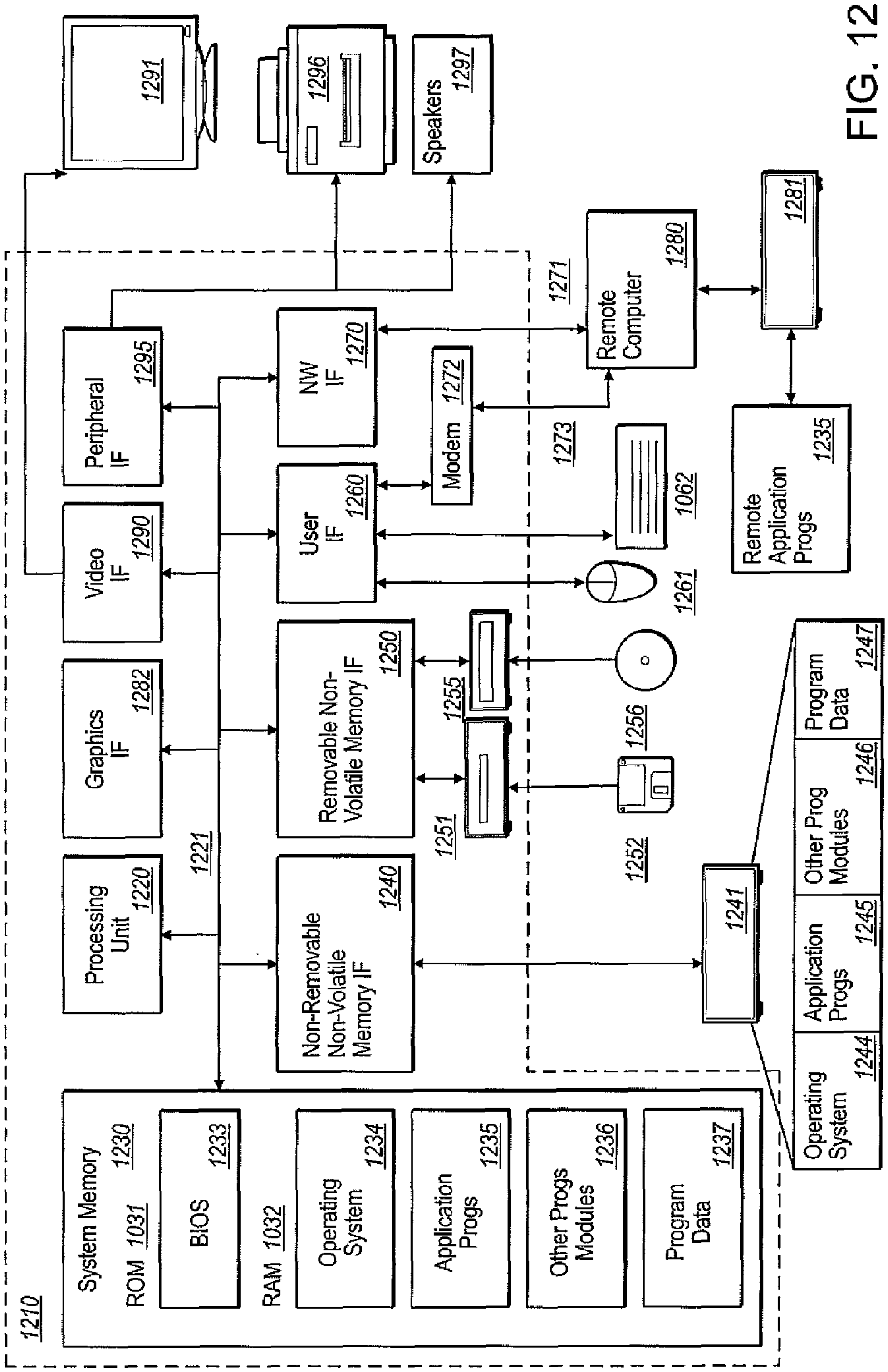
FIG. 12 is a block diagram of a computer system which may be used to implement computing features of the invention.

FIG. 12 illustrates a computer system 1210 that may be used to implement any of the servers and computer systems discussed herein. Components of computer 1210 may include, but are not limited to, a processing unit 1020, a system memory 1230, and a system bus 1221 that couples various system components including the system memory to the processing unit 1220. The system bus 1221 may be any of several types of bus structures including a memory bus or memory controller, a peripheral bus, and a local bus using any of a variety of bus architectures.

Computer 1210 typically includes a variety of computer readable media. Computer readable media can be any available media that can be accessed by computer 1210 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 1210. Computer storage media typically embodies computer readable instructions, data structures, program modules or other data.

The system memory 1230 includes computer storage media in the form of volatile and/or nonvolatile memory such as read only memory (ROM) 1231 and random access memory (RAM) 1232. A basic input/output system 1233 (BIOS), containing the basic routines that help to transfer information between elements within computer 1210, such as during start-up, is typically stored in ROM 1231. RAM 1232 typically contains data and/or program modules that are immediately accessible to and/or presently being operated on by processing unit 1220. By way of example, and not limitation, FIG. 12 illustrates operating system 1234, application programs 1235, other program modules 1236, and program data 1237.

The computer 1210 may also include other removable/non-removable, volatile/nonvolatile computer storage media. By way of example only, FIG. 12 illustrates a hard disk drive 1240 that reads from or writes to non-removable, nonvolatile magnetic media, a magnetic disk drive 1251 that reads from or writes to a removable, nonvolatile magnetic disk 1252, and an optical disk drive 1255 that reads from or writes to a removable, nonvolatile optical disk 1256, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1241 is typically connected to the system bus 1221 through a non-removable memory interface such as interface 1240, and magnetic disk drive 1251 and optical disk drive 1255 are typically connected to the system bus 1221 by a removable memory interface, such as interface 1250.

The drives and their associated computer storage media discussed above and illustrated in FIG. 12 provide storage of computer readable instructions, data structures, program modules and other data for the computer 1210. In FIG. 12, for example, hard disk drive 1241 is illustrated as storing operating system 1244, application programs 1245, other program modules 1246, and program data 1247. Note that these components can either be the same as or different from operating system 1234, application programs 1235, other program modules 1236, and program data 1237. Operating system 1244, application programs 1245, other program modules 1246, and program data 1247 are given different numbers here to illustrate that, at a minimum, they are different copies. A user may enter commands and information into the computer 1210 through input devices such as a keyboard 1262 and pointing device 1261, commonly referred to as a mouse, trackball or touch pad. Other input devices (not shown) may include a microphone, joystick, game pad, satellite dish, scanner, or the like. These and other input devices are often connected to the processing unit 1220 through a user input interface 1260 that is coupled to the system bus, but may be connected by other interface and bus structures, such as a parallel port, game port or a universal serial bus (USB). A monitor 1291 or other type of display device is also connected to the system bus 1221 via an interface, such as a video interface 1290. In addition to the monitor, computers may also include other peripheral output devices such as speakers 1297 and printer 1296, which may be connected through an output peripheral interface 1290.

The computer 1210 may operate in a networked environment using logical connections to one or more remote computers, such as a remote computer 1280. The remote computer 1280 may be a personal computer, a server, a router, a network PC, a peer device or other common network node, and typically includes many or all of the elements described above relative to the computer 1210, although only a memory storage device 1281 has been illustrated in FIG. 12. The logical connections depicted in FIG. 12 include a local area network (LAN) 1271 and a wide area network (WAN) 1273, but may also include other networks. Such networking environments are commonplace in offices, enterprise-wide computer networks, intranets and the Internet.

When used in a LAN networking environment, the computer 1210 is connected to the LAN 1271 through a network interface or adapter 1270. When used in a WAN networking environment, the computer 1210 typically is includes a modem 1272 or other means for establishing communications over the WAN 1273, such as the Internet. The modem 1272, which may be internal or external, may be connected to the system bus 1221 via the user input interface 1260, or other appropriate mechanism. In a networked environment, program modules depicted relative to the computer 1210, or portions thereof, may be stored in the remote memory storage device. By way of example, and not limitation, FIG. 12 illustrates remote application programs 1285 as residing on memory device 1281. It will be appreciated that the network connections shown are exemplary and other means of establishing a communications link between the computers may be used.

The system and techniques just described have several advantages. First, multiple articles of manufacture may be engraved in a single engraving job, resulting in savings of time and operator attention for loading and unloading articles of manufacture into the engraving station for engraving. Second, the articles can be engraved through transparent packaging so that the articles need not be removed from their packaging prior to engraving, saving time, cost, and materials.

Those of skill in the art will appreciate that the invented method and apparatus described and illustrated herein may be implemented in software, firmware or hardware, or any suitable combination thereof. Thus, those of skill in the art will appreciate that the methods and systems described herein may be implemented by one or more processors executing computer-readable instructions being stored for execution on one or more computer-readable media. Alternative embodiments are contemplated, however, and are within the spirit and scope of the invention.

Although this preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. An assembly, comprising:

a manufacturing carrier comprising a plurality of seats, each seat having an associated alignment prong; and a first individually-packaged article of manufacture, the first individually-packaged article of manufacture comprising a first article of manufacture packaged in an associated first packaging, the first packaging comprising a first body having a first alignment cutout that exposes a portion of the first article of manufacture;

a second individually-packaged article of manufacture, the second individually-packaged article of manufacture comprising a second article of manufacture packaged in an associated second packaging, the second packaging comprising a second body having a second alignment cutout that exposes a portion of the second article of manufacture; and wherein the first individually-packaged article of manufacture is loaded in a first seat of the plurality of seats of the manufacturing carrier such that the alignment prong associated with the first seat engages the portion of the first article of manufacture that is exposed by the first alignment cutout, and wherein the second individually-packaged article of manufacture is loaded in a second seat of the plurality of seats of the manufacturing carrier such that the alignment prong associated with the second seat engages the portion of the second article of manufacture that is exposed by the second alignment cutout.

2. The manufacturing carrier of claim 1, the seat configured to receive individually packaged business card holders.

3. The manufacturing carrier of claim 1, the seat configured to receive individually packaged pens.

4. The assembly of claim 1, wherein the carrier further comprises at least one additional seat having a corresponding alignment prong and loaded with a respective additional individually-packaged article of manufacture such that the respective alignment prong engages a respective portion of the respective article of manufacture exposed through a respective alignment cutout of the respective packaging body associated with the respective additional individually-packaged article of manufacture.

5. A method for loading a manufacturing carrier, the manufacturing carrier comprising a plurality of seats each having at least one alignment prong, the method comprising:

receiving a plurality of articles of manufacture, each respective article of manufacture individually packaged inside of respective packaging, the respective packaging comprising a packaging body having a respective alignment cutout that exposes through the packaging body a respective portion of the article of manufacture;

loading respective seats of the carrier with respective ones of the individually-packaged articles of manufacture such that the respective alignment prong engages a respective portion of the respective article of manufacture exposed through a respective alignment cutout of the respective packaging body associated with the respective individually-packaged article of manufacture.

* * * * *